(12) United States Patent
Nonaka et al.

(10) Patent No.: US 8,972,300 B2
(45) Date of Patent: Mar. 3, 2015

(54) CONTENT DISTRIBUTION SYSTEM

(75) Inventors: Masao Nonaka, Osaka (JP); Toshihisa Nakano, Osaka (JP); Yuichi Futa, Osaka (JP); Motoji Ohmori, Osaka (JP); Kazukuni Kobara, Chiba (JP); Ryo Nojima, Tokyo (JP); Hideki Imai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1110 days.

(21) Appl. No.: 11/790,613

(22) Filed: Apr. 26, 2007

(65) Prior Publication Data

US 2007/0282749 A1 Dec. 6, 2007

(30) Foreign Application Priority Data

Apr. 27, 2006 (JP) .................................. 2006-123619

(51) Int. Cl.
*H04K 1/00* (2006.01)
*H04L 9/00* (2006.01)
(Continued)

(52) U.S. Cl.
CPC .... *G11B 20/00086* (2013.01); *G11B 20/00173* (2013.01); *G11B 20/00195* (2013.01); *G11B 20/0021* (2013.01); *G11B 20/00246* (2013.01); *G11B 20/00884* (2013.01); *G11B 2220/2575* (2013.01); *H04H 60/18* (2013.01); *H04N 1/32128* (2013.01); *H04N 5/775* (2013.01); *H04N 5/85* (2013.01); *H04N 5/913* (2013.01); *H04N 21/4334* (2013.01); *H04N 21/4405* (2013.01); *H04N 21/4408* (2013.01); *H04N 21/4627* (2013.01); *H04N 21/8355* (2013.01); *H04N 2005/91335* (2013.01); *H04N 2005/91364* (2013.01); *H04N 2201/323* (2013.01); *H04N 2201/3236* (2013.01); *H04N 2201/3281* (2013.01); *H04L 9/0838* (2013.01); *H04L 9/14* (2013.01); *H04L 2209/60* (2013.01)
USPC ............................... 705/57; 380/30; 713/157

(58) Field of Classification Search
USPC ........................................................ 705/1–79
See application file for complete search history.

(56) References Cited

U.S. PATENT DOCUMENTS 4,595,950 A * 6/1986 Lofberg ........................ 380/202
5,319,453 A * 6/1994 Copriviza et al. ................. 346/6
(Continued)

*Primary Examiner* — Kimberly Berona
*Assistant Examiner* — Murali Dega
(74) *Attorney, Agent, or Firm* — Wenderoth, Lind & Ponack, L.L.P.

(57) ABSTRACT

A transmission device including: copy unit that extracts part or all of partial contents, as tracking information, from a content, and copies the extracted tracking information, thereby generating pieces of tracking information; candidate information obtaining unit that obtains pieces of candidate information respectively corresponding to the pieces of tracking information; evidence information obtaining unit that obtains evidence information generated dependently on a piece of candidate information selected by the reception device from among the pieces of candidate information; hash generating unit that generates hash values respectively in accordance with the pieces of candidate information; embed unit that embeds the hash values respectively into the pieces of tracking information, and embeds the evidence information into each piece of tracking information; and transmit unit that transmits each piece of tracking information in which a hash value and the evidence information have been embedded.

4 Claims, 25 Drawing Sheets

(51) Int. Cl.
*H04L 9/30* (2006.01)
*H04L 29/06* (2006.01)
*G11B 20/00* (2006.01)
*H04H 60/18* (2008.01)
*H04N 1/32* (2006.01)
*H04N 5/913* (2006.01)
*H04N 21/433* (2011.01)
*H04N 21/4405* (2011.01)
*H04N 21/4408* (2011.01)
*H04N 21/4627* (2011.01)
*H04N 21/8355* (2011.01)
*H04L 9/08* (2006.01)
*H04L 9/14* (2006.01)
*H04N 5/775* (2006.01)
*H04N 5/85* (2006.01)

(56) References Cited

U.S. PATENT DOCUMENTS

| | | | |
|---|---|---|---|
| 5,646,675 A * | 7/1997 | Copriviza et al. | 725/22 |
| 6,285,774 B1 | 9/2001 | Schumann et al. | |
| 2001/0013097 A1* | 8/2001 | Ito et al. | 713/176 |
| 2002/0138439 A1* | 9/2002 | Matsushima et al. | 705/52 |
| 2003/0163693 A1* | 8/2003 | Medvinsky | 713/169 |
| 2005/0055399 A1* | 3/2005 | Savchuk | 709/203 |
| 2005/0177716 A1* | 8/2005 | Ginter et al. | 713/157 |
| 2005/0185792 A1* | 8/2005 | Tokutani et al. | 380/30 |
| 2005/0198274 A1* | 9/2005 | Day | 709/224 |
| 2006/0020806 A1* | 1/2006 | Yamashita et al. | 713/176 |
| 2006/0123025 A1* | 6/2006 | DeMello et al. | 707/100 |
| 2006/0136750 A1* | 6/2006 | Jakubowski et al. | 713/193 |
| 2007/0020806 A1* | 1/2007 | Steegan et al. | 438/106 |

* cited by examiner

CONTENT DISTRIBUTION SYSTEM

This application is based on an application No. 2006-123619 filed in Japan, the content of which is hereby incorporated by reference.

BACKGROUND OF THE INVENTION (1) Field of the Invention

The present invention relates to a technology for transmitting/receiving digital data of a work such as a movie or music (hereinafter, such digital data is referred to as "content"), and specifically relates to a technology for preventing a copyright infringement such as copying a content in an unauthorized manner, and, if an unauthorized copy of a content is found to be distributed, identifying a device that generated the unauthorized copy.

(2) Description of the Related Art

In recent years, as the personal use of contents has become prevalent, what are called "pirated contents", which are generated by copying contents in an unauthorized manner, have come to circulate.

U.S. Pat. No. 6,285,774 discloses a technology for identifying, from an unauthorized copy, a client that has made the unauthorized copy, within a model where a server distributes contents to clients.

More specifically, the server copies a scene within a content and thereby generates n copies of the scene, and embeds different electronic watermarks respectively into the copies of the scene. The server then encrypts each of the plurality of copies using a different encryption key, and distributes the content to the clients. Each client holds one of a plurality of different keys, and plays back the content by decrypting a specified portion of the content using the key.

And then, if a pirated version of the content is found to be distributed, it is possible to identify the client that made the unauthorized copy, by checking the electronic watermark that is embedded in the pirated content.

However, there is a possibility that, although it should not happen, the server performs unauthorized copying, and there is a demand from content holders to prevent the server from performing the unauthorized copying.

Also, recently, in some homes, a plurality of terminal devices held by users are connected to each other via a network, and contents are transferred between the terminal devices. In such a case, each terminal device can be either a server (transmission side) or a client (reception side). This requires a mechanism for preventing the transmission side, as well as the reception side, from performing an unauthorized act.

Here, a problem of the technology disclosed in U.S. Pat. No. 6,285,774 is that it cannot prevent the transmission side from performing an unauthorized act, although it does the reception side.

SUMMARY OF THE INVENTION

The object of the present invention is therefore to provide a content distribution system for preventing a transmission device, which transmits a content, from performing an unauthorized act by disguising a reception device which receives a content.

Here, an explanation will be given with respect to the recitation that "a transmission device performs an unauthorized act by disguising a reception device".

A transmission device, which obtains a content from a content holder, is expected to distribute the content via authorized distribution routes. If the transmission device generates a pirated content by copying the content in an unauthorized manner and distributes the pirated content, the unauthorized act is easily detected by the content holder. For this reason, it is generally inconceivable that the transmission device performs such an unauthorized act. However, it is possible for the transmission device to generate a pirated content by embedding thereinto information indicating that a reception device made the unauthorized copy, as will be discussed later.

Further, in a situation where contents are transferred between terminal devices held by users, a terminal device on the transmission side can generate a pirated content by embedding thereinto information indicating that a terminal device on the reception side made the unauthorized copy, as will be discussed later. Especially in this case, there is a high possibility that an unauthorized act is performed because contents are transferred between terminal devices held by end users.

Any of the above-described cases is referred to as "a transmission device performs an unauthorized act by disguising a reception device".

The above object is fulfilled by a transmission device for transmitting contents to a reception device, the transmission device comprising: a copy unit operable to extract part or all of partial contents, as tracking information, from a content, and copy the extracted tracking information and thereby generate a plurality of pieces of tracking information; a candidate information obtaining unit operable to obtain a plurality of pieces of candidate information that respectively correspond to the plurality of pieces of tracking information; an evidence information obtaining unit operable to obtain evidence information that is generated depending on a piece of candidate information having been selected by the reception device from among the plurality of pieces of candidate information; a hash generating unit operable to generate a plurality of hash values respectively in accordance with the plurality of pieces of candidate information; an embed unit operable to embed, respectively into the plurality of pieces of tracking information, the hash values that were generated in accordance with the plurality of pieces of candidate information that respectively correspond to the plurality of pieces of tracking information, and embed the evidence information into each of the plurality of pieces of tracking information; and a transmit unit operable to transmit each piece of tracking information in which a hash value and the evidence information have been embedded.

The above object is also fulfilled by a reception device for receiving contents from a transmission device, the reception device comprising: a select unit operable to select one from among a plurality of pieces of candidate information that respectively correspond to a plurality of pieces of tracking information, which are generated by copying part or all of partial contents constituting a content; a generate unit operable to generate evidence information in accordance with the selected piece of candidate information; a transmit unit operable to transmit the evidence information to the transmission device; and an obtain unit operable to obtain, from the transmission device, a piece of tracking information that corresponds to the selected piece of candidate information.

With the above-described structures, the transmission device cannot identify, from the evidence information received from the reception device, which piece of candidate information was selected by the reception device. As a result, the transmission device cannot recognize which piece of tracking information is obtained by the reception device.

For the above-stated reason, it is extremely difficult for the transmission device to identify the content obtained by the reception device, make copies of a content in which the same electronic watermark as that embedded in the content obtained by the reception device is embedded, distribute only the copies, and not to distribute any contents in which other electronic watermarks are embedded. Accordingly, it is realistically impossible for the transmission device to distribute pirated contents by disguising the reception device.

In the above-stated transmission device, the content data may be multimedia data that includes video and/or audio, and the embed unit may embed the hash value and the evidence information into each piece of tracking information by an electronic watermark technology.

The above-stated transmission device may further comprise a content key generating unit operable to generate a plurality of pieces of content key data that are used for sending, through a confidential communication, each piece of tracking information, wherein the plurality of pieces of candidate information are generated respectively in accordance with the plurality of pieces of content key data.

The above-stated transmission device may further comprise a content key generating unit operable to generate a plurality of pieces of content key data that are used for encrypting each piece of tracking information, and to generate a plurality of content key data identifiers for identifying the plurality of pieces of content key data respectively, wherein the plurality of pieces of candidate information are generated respectively in accordance with the plurality of content key data identifiers.

The above-stated transmission device may further hold public key data and secret key data that are respectively associated with the transmission device itself, wherein the plurality of pieces of candidate information are generated respectively in accordance with the public key data.

The above-stated transmission device may further comprise a random number generating unit operable to generate a plurality of pieces of random number data that are used for sending, through a confidential communication, each piece of tracking information, wherein the plurality of pieces of candidate information are generated respectively in accordance with the plurality of pieces of random number data.

With the above-described structure, the transmission device can generate the candidate information without holding the public key data preliminarily or obtaining the public key data from outside. And the transmission device cannot recognize a random number based on which piece of candidate information selected by the reception device was generated.

The above-stated transmission device may further hold a plurality of pieces of public key data and a plurality of pieces of secret key data that are respectively associated with the transmission device itself, wherein the plurality of pieces of candidate information are generated respectively in accordance with the plurality of pieces of public key data.

With the above-described structure, since the candidate information is generated based on the public key data, the candidate information transmission/reception process performed between the transmission device and the reception device is highly safe. And the transmission device cannot recognize a piece of public key data based on which piece of candidate information selected by the reception device was generated.

The above-stated transmission device may further hold a plurality of pieces of public key data, a plurality of pieces of secret key data, and a plurality of public key identifiers that are respectively associated with the transmission device itself, wherein the plurality of pieces of candidate information are generated respectively in accordance with the plurality of public key identifiers.

With the above-described structure, compared with a case where the candidate information is generated based on the public key data, the candidate information transmission/reception process performed between the transmission device and the reception device is highly safe. And the transmission device cannot recognize a public key data identifier based on which the piece of candidate information selected by the reception device was generated.

In the above-stated transmission device, the evidence information may be generated in accordance with a piece of public key data that is associated with the reception device, by a public key encryption.

With the above-described structure, the transmission device cannot recognize the secret key data of the reception device. As a result, the transmission device cannot recognize, from the obtained evidence information, which piece of candidate information was selected by the reception device. Accordingly, it is extremely difficult for the transmission device to identify the content obtained by the reception device, make copies of a content in which the same electronic watermark as that embedded in the content obtained by the reception device is embedded, distribute only the copies, and not to distribute any contents in which other electronic watermarks are embedded. Accordingly, it is realistically impossible for the transmission device to distribute pirated contents by disguising the reception device.

In the above-stated transmission device, the evidence information may contain electronic signature data that is generated in accordance with a piece of secret key data that is associated with the reception device, by a public key encryption.

With the above-described structure, the transmission device can judge whether or not the reception device has transmitted an authentic piece of evidence information, by verifying the electronic signature data. If it is judged that the reception device has not transmitted an authentic piece of evidence information, the transmission device stops the content transmission/reception process with the reception device, and thus can protect the copyright of the content.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Embodiment 1

A content distribution system 1 in Embodiment 1 of the present invention will be described with reference to the attached drawings.

<Overview>

The following is an overview of the content distribution system 1.

Figure 1:
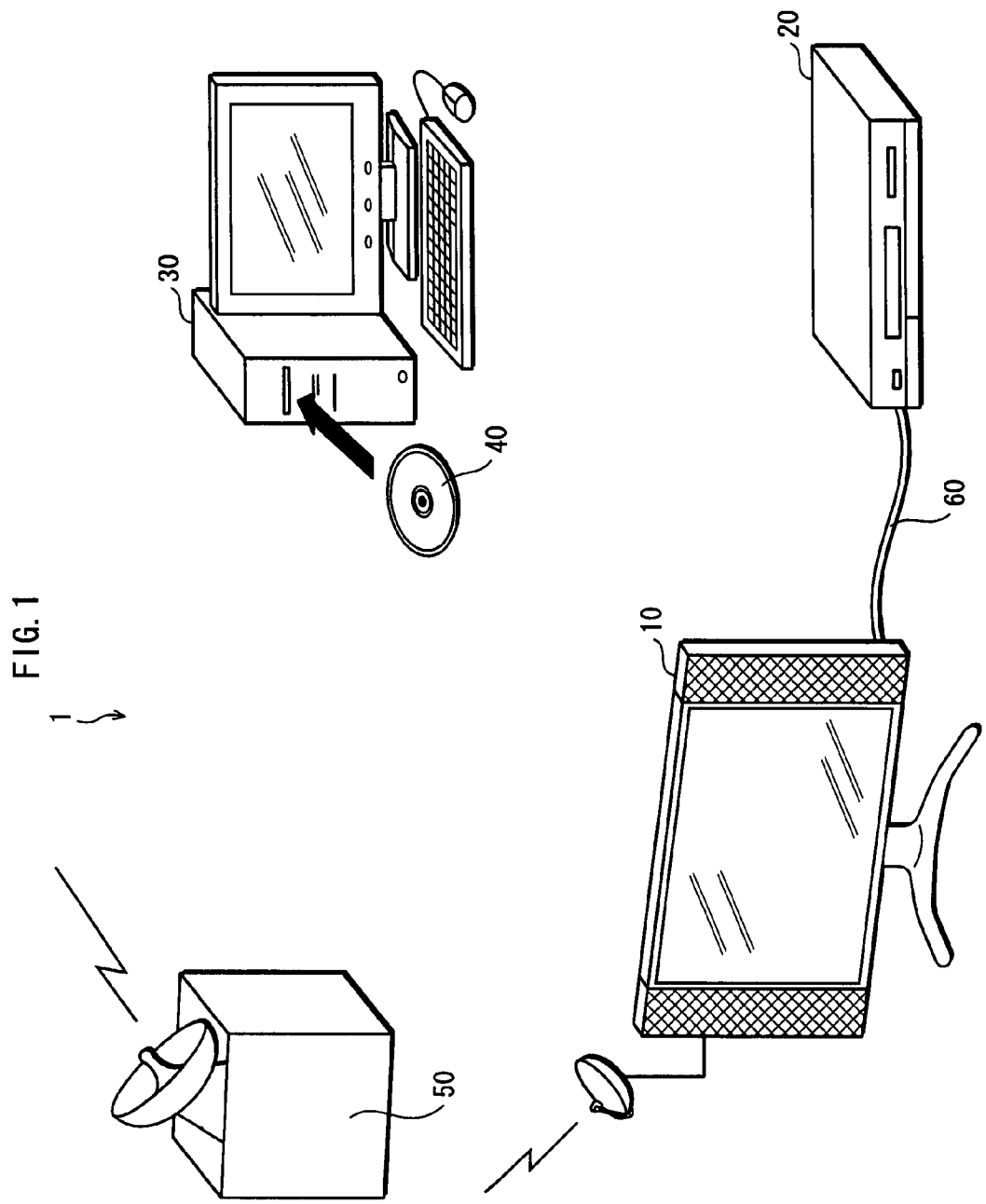
FIG. 1 is a system structure diagram showing the structure of the content distribution system 1.

FIG. 1 is a system structure diagram showing the structure of the content distribution system 1.

As shown in FIG. 1, the content distribution system 1 includes a transmission device 10, a reception device 20, an unauthentic content source identifying device 30, a recording medium 40, and a broadcast station device 50. Here, the transmission device 10 and the reception device 20 are connected to each other via a cable 60.

The broadcast station device 50 is, specifically, a device installed in a broadcast station that broadcasts the terrestrial digital broadcasting, and broadcasts a content, in which video data and audio data are multiplexed and which is compressed/encoded, over a digital broadcast wave.

The transmission device 10 is, specifically, a digital TV receiver that receives the terrestrial digital broadcasting, and receives the content broadcast from the broadcast station device 50. The transmission device 10 converts the received content into the video data and the audio data, and outputs them to a display or the like.

The reception device 20 is, specifically, a DVD recorder that can record the content, receives the content from the transmission device 10 via the cable 60, and records the received content onto a DVD-RAM or the like.

The cable 60 is a communication path for transmitting/receiving various types of data between the transmission device 10 and the reception device 20, and is, for example, an Ethernet cable, a USB (Universal Serial Bus) cable, or an IEEE1394 cable.

The recording medium 40 is, specifically, a DVD-RAM, and stores therein what is called a pirated content that was generated by unauthorized copying.

The unauthentic content source identifying device 30 is a device that the system manager has, and identifies a device that implemented the unauthorized act, from the pirated content stored in the recording medium 40.

In the content distribution system 1, when the transmission device 10 transfers a content to the reception device 20, first the transmission device 10 generates a plurality of content keys, and transmits the generated content keys to the reception device 20. In response to this, the reception device 20 selects and receives one among the plurality of content keys, and makes the remaining content keys unreceivable. The transmission device 10 cannot recognize which from among the plurality of content keys the reception device 20 selected.

After this, the transmission device 10 generates a plurality of copies of the content, and encrypts the plurality of contents using different content keys, respectively. Before this encryption, the transmission device 10 embeds evidence information and a value, as electronic watermarks, into each of the plurality of contents, where the evidence information indicates the content key that was selected by the reception device 20, and the value indicates a content key that is used to encrypt the content. The transmission device 10 then transmits a plurality of encrypted contents, in each of which an electronic watermark has been embedded, to the reception device 20.

Upon receiving the plurality of encrypted contents, the reception device 20 decrypts one of the plurality of encrypted contents, using the content key that has been selected preliminarily by the reception device 20 itself.

On the other hand, if a pirated content is found to be distributed in the market, the unauthentic content source identifying device 30 obtains content data from the recording medium 40 in which the pirated content is recorded, and extracts an electronic watermark from the content data. The unauthentic content source identifying device 30 obtains evidence information and a value indicating a content key from the extracted electronic watermark, and judges, by investigating the obtained evidence information and value, whether the source of the pirated content is the transmission device 10 or the reception device 20.

<Structure>

Here will be described a detailed structure of each device.

1. Transmission Device 10

Figure 2:
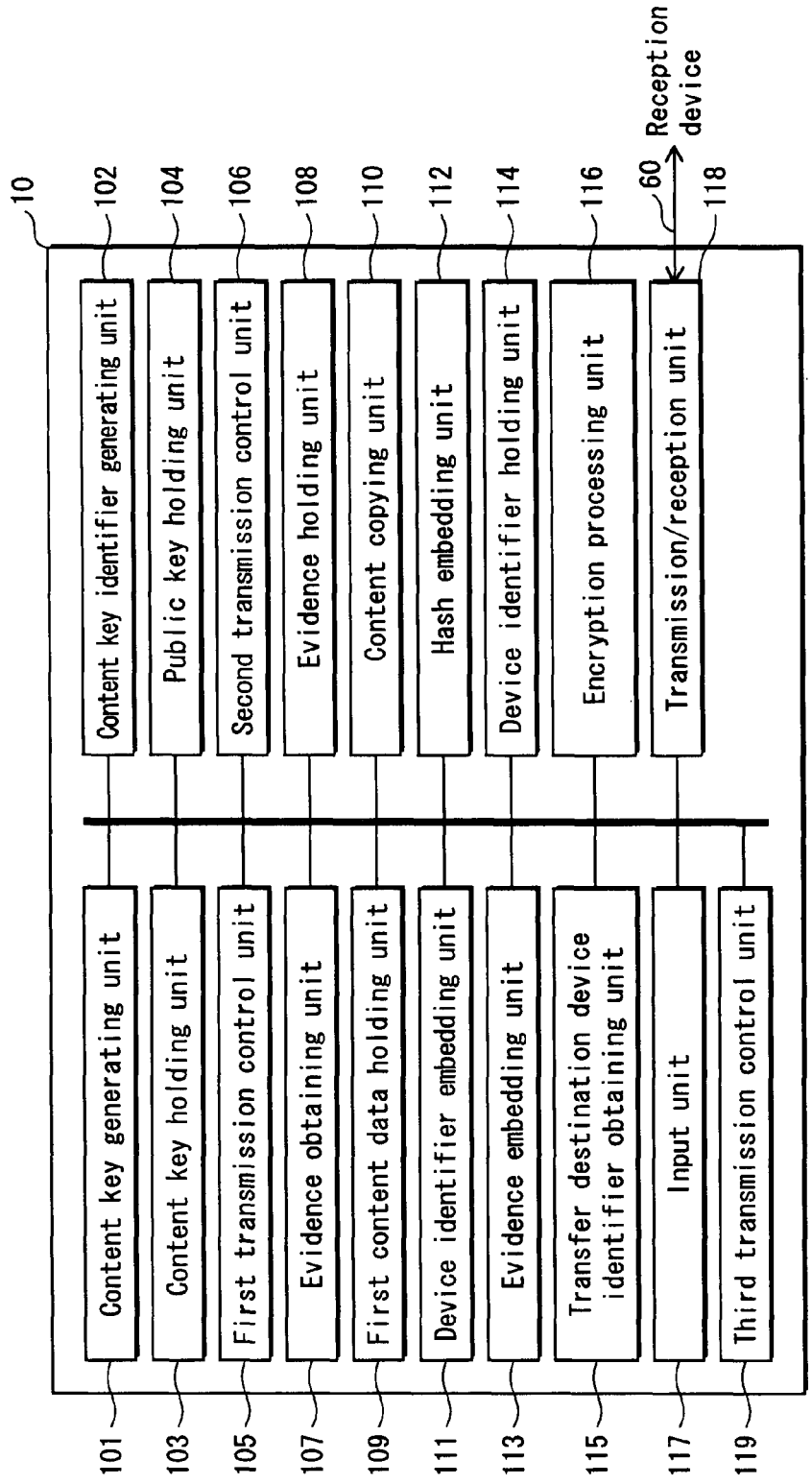
FIG. 2 is a block diagram showing the structure of the transmission device 10.

FIG. 2 is a block diagram showing the structure of the transmission device 10. As shown in FIG. 2, the transmission device 10 includes a content key generating unit 101, a content key identifier generating unit 102, a content key holding unit 103, a public key holding unit 104, a first transmission control unit 105, a second transmission control unit 106, an evidence obtaining unit 107, an evidence holding unit 108, a first content data holding unit 109, a content copying unit 110, a device identifier embedding unit 111, a hash embedding unit 112, an evidence embedding unit 113, a device identifier holding unit 114, a transfer destination device identifier obtaining unit 115, an encryption processing unit 116, an input unit 117, a transmission/reception unit 118, and a third transmission control unit 119.

The transmission device 10 is more specifically a computer system including a microprocessor, a ROM, a RAM, a hard disk unit and the like. A computer program is recorded in the ROM, the RAM or the hard disk unit. The transmission device 10 achieves its functions as the microprocessor operates in accordance with the computer program.

Each block constituting the transmission device 10 may be structured by either hardware or software.

Now, each block constituting the transmission device 10 will be described.

(1) Content Key Generating Unit 101

The content key generating unit 101, upon receiving a content key generation request REQ1 from the transfer destination device identifier obtaining unit 115, generates n 128-bit content keys $CK\_1, CK\_2, \ldots, CK\_n$, where "n" is a predetermined integer of 2 or higher. One example of the method of generating the content key is such that the content key generating unit 101 generates random numbers using a random number generator.

The content key generating unit 101 outputs the generated n content keys $CK\_1, CK\_2, \ldots, CK\_n$ to the content key identifier generating unit 102.

(2) Content Key Identifier Generating Unit 102

The content key identifier generating unit 102, upon receiving the n content keys $CK\_1, CK\_2, \ldots, CK\_n$ from the content key generating unit 101, generates n content key identifiers $CKID\_1, CKID\_2, \ldots, CKID\_n$ that identify the content keys, respectively. It is presumed here as one example that the content key identifier generating unit 102 generated n content key identifiers $CKID\_1, CKID\_2, \ldots, CKID\_n$ by incrementing a value by 1 starting with 1. Accordingly, $CKID\_1$ is 1, $CKID\_2$ is 2, ..., $CKID\_n$ is n.

The content key identifier generating unit 102 stores the n content keys $CK\_1, CK\_2, \ldots, CK\_n$ and the n 0.12 content key identifiers $CKID\_1, CKID\_2, \ldots, CKID\_n$ into the content key holding unit 103 by associating each of the keys with a corresponding one of the identifiers.

The content key identifier generating unit 102 then outputs a first transmission control start request REQ2 to the first transmission control unit 105.

(3) Content Key Holding Unit 103

Figure 3:
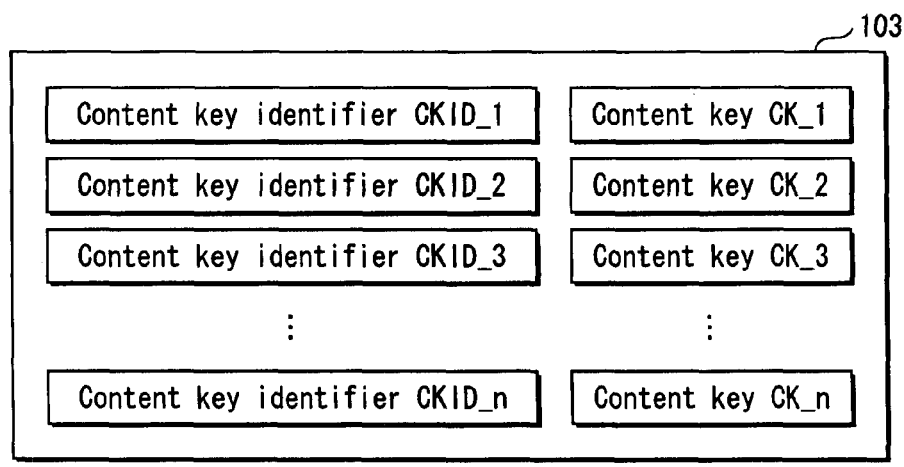
FIG. 3 shows information held by the content key holding unit 103.

The content key holding unit 103, as shown in FIG. 3, holds n pairs of content key identifier and content key that correspond to each other: $\{(CKID\_1,CK\_1), (CKID\_2, CK\_2), \ldots, (CKID\_n,CK\_n)\}$.

(4) Public Key Holding Unit 104

Figure 4:
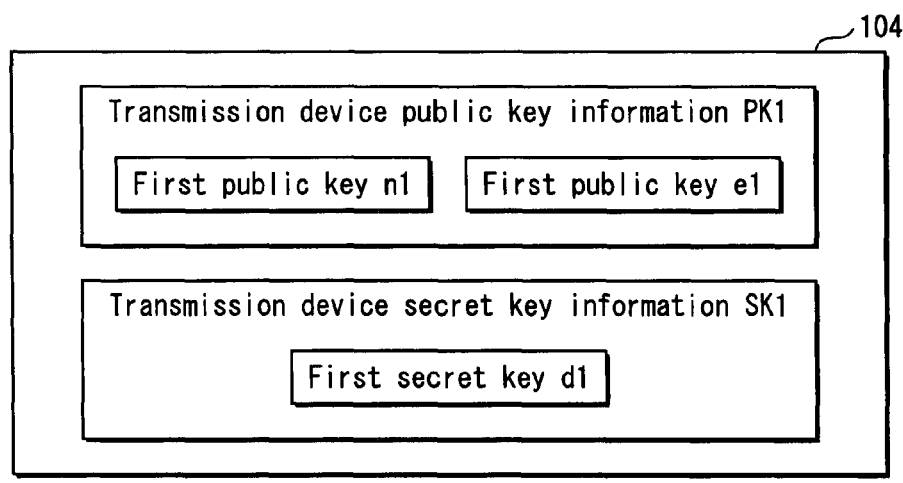
FIG. 4 shows information held by the public key holding unit 104.

The public key holding unit 104, as shown in FIG. 4, holds transmission device public key information PK1 and transmission device secret key information SK1.

The transmission device public key information PK1 is composed of a first public key n1 and a first public key e1 that are generated by the public key encryption algorithm RSA (Rivest Shamir Adleman). The transmission device secret key information SK1 is composed of a first secret key d1 that is a secret key generated by the RSA. The key information is calculated by the system manager and is stored into the public key holding unit 104 when the transmission device is manufactured. The following describes generation methods of the key information.

(a) Generation Method of First Public Key n1, e1

First, the system manager generates two 512-bit prime numbers p1 and q1 randomly. The system manager then multiplies p1 by q1 (namely, performs p1×q1) to obtain a 1024-bit value "n1". The system manager then calculates "L1" based on the equation "L1=LCM(p1-1,q1-1)", where LCM (x,y) represents the least common multiple of x and y. The system manager then generates a value "e1" which is a relatively prime number with respect to L1. The value e1 is, for example, 11. The values n1 and e1 having been generated in this way are provided as the first public keys.

(b) Generation Method of First Secret Key d1

The system manager calculates a value "d1" based on the equation "e1×d1=1(mod L1)", where (mod L1) represents a remainder when divided by L1. The value d1 can be calculated by using the extended Euclidean algorithm. The extended Euclidean algorithm is known, and description thereof is omitted. The value d1 generated in this way is provided as the first secret key.

(5) First Transmission Control Unit 105

The first transmission control unit 105, upon receiving the first transmission control start request REQ2 from the content key identifier generating unit 102, first obtains the n pairs of content key identifier and content key $\{(CKID\_1,CK\_1), (CKID\_2,CK\_2), \ldots, (CKID\_n,CK\_n)\}$ from the content key holding unit 103.

Next, the first transmission control unit 105 outputs the n content keys $CK\_1, CK\_2, \ldots, CK\_n$ and an RSA encryption process request RSAE to the encryption processing unit 116. The first transmission control unit 105 then receives n first encrypted content keys being encrypted data. In the description hereinafter, an RSA-encrypted text, namely, a first encrypted content key corresponding to a content key $CK\_i$ is represented as $ECK\_i$, where $i=1, 2, \ldots, n$.

Figure 8:
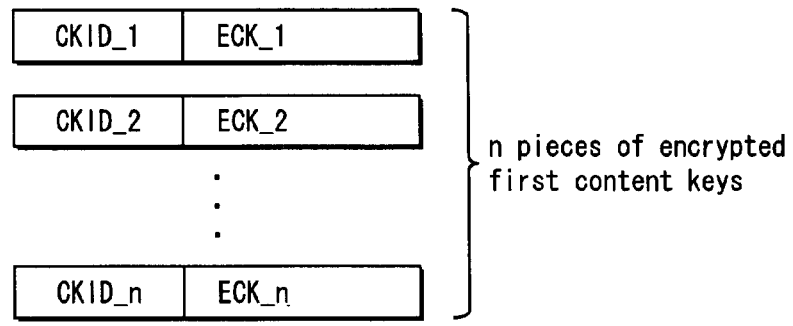
FIG. 8 shows encrypted content keys transmitted from the transmission device 10 to the reception device 20.

Following this, the first transmission control unit 105 associates each of the content key identifiers with a corresponding one of the first encrypted content keys, and, as shown in FIG. 8, transmits n pairs of content key identifier and first encrypted content key $\{(CKID\_1,ECK\_1), (CKID\_2, ECK\_2), \ldots, (CKID\_n,ECK\_n)\}$ to the reception device 20.

(6) Second Transmission Control Unit 106

The second transmission control unit 106, upon receiving a second encrypted content key E2CK from the reception device 20 via the transmission/reception unit 118, outputs the second encrypted content key E2CK and an RSA decryption process request RSAD to the encryption processing unit 116. The second transmission control unit 106 then receives, from the encryption processing unit 116, a third encrypted content key E3CK that is data obtained by decrypting the second encrypted content key E2CK.

Next, the second transmission control unit 106 outputs the third encrypted content key E3CK to the evidence obtaining unit 107, and transmits the third encrypted content key E3CK to the reception device 20 via the transmission/reception unit 118.

Next, the second transmission control unit 106 outputs a content transfer request REQ3 to the third transmission control unit 119.

(7) Evidence Obtaining Unit 107

The evidence obtaining unit 107, upon receiving the third encrypted content key E3CK from the second transmission control unit 106, stores the received third encrypted content key E3CK into the evidence holding unit 108 as evidence information EV.

(8) Evidence Holding Unit 108

Figure 5:
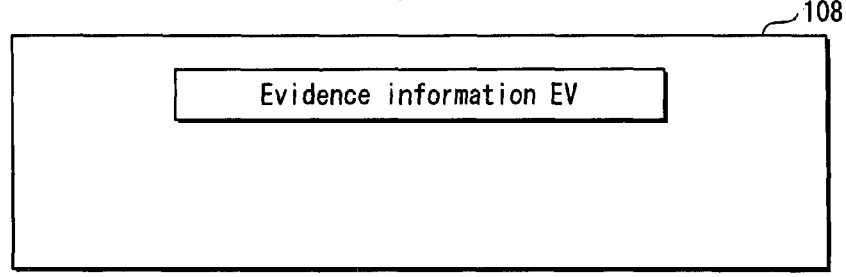
FIG. 5 shows information held by the evidence holding unit 108.

The evidence holding unit 108, as shown in FIG. 5, holds the evidence information EV. As described above, the evidence information EV is data that is identical with the third encrypted content key E3CK.

(9) First Content Data Holding Unit 109

Figure 6:
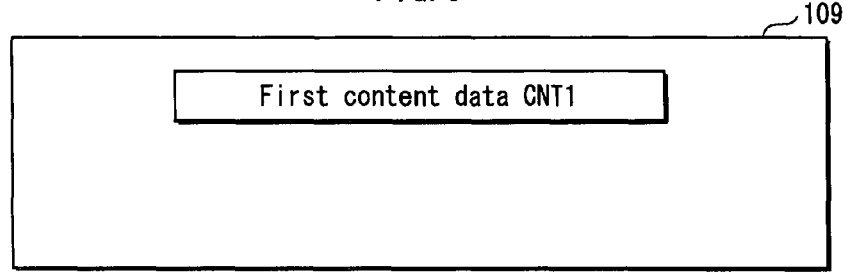
FIG. 6 shows information held by the first content data holding unit 109.

The first content data holding unit 109, as shown in FIG. 6, holds first content data CNT1. The first content data CNT1 is content data in a format that can be used by the transmission device 10.

(10) Content Copying Unit 110

The content copying unit 110, upon receiving the first content data CNT1 from the third transmission control unit 119, generates n pieces of first content data CNT1_1, CNT1_2, ..., CNT1_n, each of which has the same content as the first content data CNT1, by copying the first content data CNT1. The content copying unit 110 outputs the generated n pieces of first content data CNT1_1, CNT1_2, ..., CNT1_n to the third transmission control unit 119.

(11) Device Identifier Embedding Unit 111

The device identifier embedding unit 111, upon receiving the n pieces of first content data CNT1_1, CNT1_2, ..., CNT1_n from the third transmission control unit 119, embeds an electronic watermark in the following procedures.

First, the device identifier embedding unit 111 obtains a transfer source device identifier ID_1 and a transfer destination device identifier ID_2 from the device identifier holding unit 114.

The transfer source device identifier ID_1 is information for identifying a transfer source of content data, namely, for identifying the transmission device 10. The transfer destination device identifier ID_2 is information for identifying a transfer destination of content data, namely, for identifying the reception device 20. It should be noted here that the transfer source device identifier ID_1 and the transfer destination device identifier ID_2 may be information that is provided when the transmission device 10 and the reception device 20 are manufactured, respectively.

Next, the device identifier embedding unit 111 generates n pieces of device identifier embedded content data DCNT1_1, DCNT1_2, ..., DCNT1_n by embedding, as the electronic watermark, the transfer source device identifier ID_1 and the transfer destination device identifier ID_2 into each of the n pieces of first content data CNT1_1, CNT1_2, ..., CNT1_n.

After this, the device identifier embedding unit 111 outputs the generated n pieces of device identifier embedded content data DCNT1_1, DCNT1_2, ..., DCNT1_n to the third transmission control unit 119.

Here, the electronic watermark is a technology for embedding watermark information, which is of a level that cannot be perceived by the human being, into still pictures, moving pictures, audio data or the like, and is characterized in that the embedded watermark is not eliminated even if the data containing thereof is processed or modified. The technology for embedding the electronic watermark is known, and description thereof is omitted.

(12) Hash Embedding Unit 112

The hash embedding unit 112, upon receiving, from the third transmission control unit 119, the n pieces of device identifier embedded content data DCNT1_1, DCNT1_2, ..., DCNT1_n in each of which the transfer source device identifier ID_1 and the transfer destination device identifier ID_2 are embedded, embeds an electronic watermark in the following procedures.

First, the hash embedding unit 112 obtains the n content keys CK_1, CK_2, ..., CK_n from the content key holding unit 103.

Next, the hash embedding unit 112 outputs the n content keys CK_1, CK_2, ..., CK_n and a hash value calculation request HASH to the encryption processing unit 116. The hash embedding unit 112 then receives, from the encryption processing unit 116, content key hashes HCK_1, HCK_2, ..., HCK_n which are hash values that respectively correspond to the n content keys CK_1, CK_2, ..., CK_n.

Following this, the hash embedding unit 112 generates n pieces of hash embedded content data HCNT1_1, HCNT1_2, ..., HCNT1_n by embedding, as an electronic watermark, n different pieces of content key hashes HCK_1, HCK_2, ..., HCK_n respectively into the n pieces of device identifier embedded content data DCNT1_1, DCNT1_2, ..., DCNT1_n.

More specifically, the hash embedding unit 112 generates HCNT1_1 by embedding HCK_1 into DCNT1_1, generates HCNT1_2 by embedding HCK_2 into DCNT1_2, ..., and generates HCNT1_n by embedding HCK_n into DCNT1_n.

The hash embedding unit 112 then outputs the generated n pieces of hash embedded content data HCNT1_1, HCNT1_2, ..., HCNT1_n to the third transmission control unit 119.

(13) Evidence Embedding Unit 113

The evidence embedding unit 113, upon receiving the n pieces of hash embedded content data HCNT1_1, HCNT1_2, ..., HCNT1_n from the third transmission control unit 119 embeds an electronic watermark in the following procedures.

First, the evidence embedding unit 113 obtains the evidence information EV from the evidence holding unit 108. The evidence embedding unit 113 then generates n pieces of evidence embedded content data VCNT1_1, VCNT1_2, ..., VCNT1_n by embedding, as an electronic watermark, the evidence information EV into each of the n pieces of hash embedded content data HCNT1_1, HCNT1_2, ..., HCNT1_n.

The evidence embedding unit 113 then outputs the generated n pieces of evidence embedded content data VCNT1_1, VCNT1_2, ..., VCNT1_n to the third transmission control unit 119.

(14) Device Identifier Holding Unit 114

Figure 7:
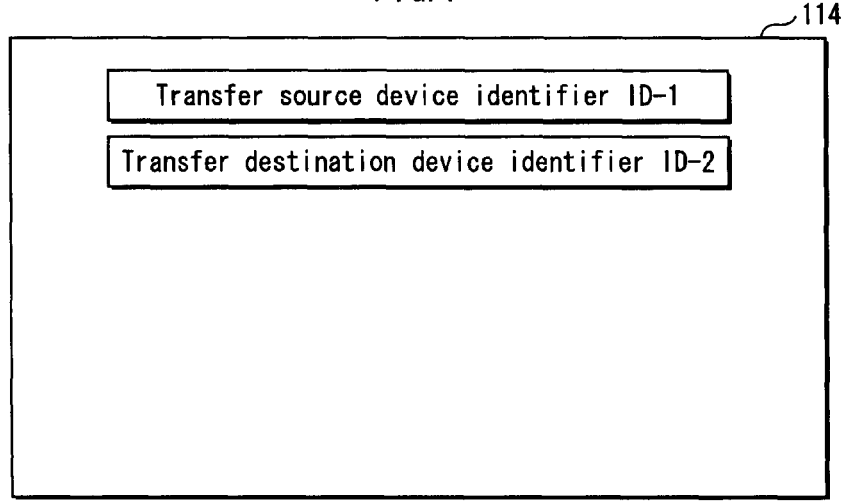
FIG. 7 shows information held by the device identifier holding unit 114.

The device identifier holding unit 114, as shown in FIG. 7, holds the transfer source device identifier ID_1 and the transfer destination device identifier ID_2.

As described earlier, the transfer source device identifier ID_1 is an identifier for identifying the transmission device 10, is an invariable value, and is provided preliminarily when the transmission device 10 is manufactured. The transfer destination device identifier ID_2 is an identifier for identifying a terminal device which is a transfer destination of content data, and changes each time the terminal device being the transfer destination of the content data changes. However, in the present embodiment, only the reception device 20 is presumed to be the transfer destination of the content data. In the present embodiment, accordingly, the transfer destination device identifier ID_2 is also an invariable value, as is the case with the transfer source device identifier ID_1.

(15) Transfer Destination Device Identifier Obtaining Unit 115

The transfer destination device identifier obtaining unit 115, upon receiving the transfer destination device identifier request information from the input unit 117, transmits transfer destination device identifier obtaining request information REQ5 to the reception device 20 via the transmission/reception unit 118. Further, upon receiving the device identifier ID_2 via the transmission/reception unit 118, the transfer destination device identifier obtaining unit 115 stores the received ID_2, as a transfer destination device identifier, into the device identifier holding unit 114.

Following this, the transfer destination device identifier obtaining unit 115 outputs the content key generation request REQ1 to the content key generating unit 101.

(16) Encryption Processing Unit 116

The encryption processing unit 116 performs the following encryption processes.

(a) Upon Receiving RSA Encryption Process Request RSAE from First Transmission Control Unit 105

The encryption processing unit 116 generates encrypted texts by encrypting the n content keys CK_1, CK_2, ..., CK_n in the following procedures.

First, the encryption processing unit 116 obtains the first public keys n1 and e1 from the transmission device public key information PK1 stored in the public key holding unit 104.

Next, the encryption processing unit 116 performs the RSA encryption process to encrypt each of the n content keys CK_1, CK_2, ..., CK_n using the first public keys n1 and e1.

More specifically, in the RSA encryption process, a calculation "M^e1 (mod n1)" is performed onto an original message M, where symbol "^" denotes exponentiation/power. For example, x^y represents $y^{th}$ power of x. Here, when the original message is content key CK_i, the encrypted text thereof is represented as CK_i^e1 (mod n1). In the following description, CK_i^e1 (mod n1) is denoted as ECK_i.

The encryption processing unit 116 outputs n encrypted texts ECK_1, ECK_2, ..., ECK_n, which respectively correspond to the n content keys, to the first transmission control unit 105.

(b) Upon Receiving RSA Decryption Process Request RSAD from Second Transmission Control Unit 106

The encryption processing unit 116 generates a decrypted text by decrypting the second encrypted content key E2CK in the following procedures.

First, the encryption processing unit 116 obtains, from the public key holding unit 104, the first public key n1, which is contained in the transmission device public key information PK1, and the first secret key d1 which is contained in the transmission device secret key information SK1.

Next, the encryption processing unit 116 performs the RSA decryption process to decrypt the second encrypted content key E2CK using the first public key n1 and the first secret key d1.

More specifically, in the RSA decryption process, a calculation "C^d1 (mod n1)" is performed onto an encrypted message C. Here, when the encrypted message is the second encrypted content key E2CK, the decrypted text thereof is represented as E2CK^d1 (mod n1). In the following description, E2CK^d1 (mod n1) is denoted as E3CK.

The encryption processing unit 116 outputs the decrypted text E3CK, which corresponds to the second encrypted content key E2CK, to the second transmission control unit 106.

(c) Upon Receiving Hash Value Calculation Request HASH from Hash Embedding Unit 112

The encryption processing unit 116 generates, by performing a calculation, the content key hashes HCK_1, HCK_2, ..., HCK_n which are hash values respectively corresponding to the n content keys CK_1, CK_2, ..., CK_n. The hash values are output values obtained as a result of inputting data into a hash function. The encryption processing unit 116 uses, for example, SHA-1 (Secure Hash Algorithm-1) as a hash function algorithm.

The encryption processing unit 116 outputs the n content key hashes HCK_1, HCK_2, ..., HCK_n to the hash embedding unit 112.

(d) Upon Receiving Content Encryption Request AESE from Third Transmission Control Unit 119

The encryption processing unit 116 performs the encryption process to encrypt each of the n pieces of evidence embedded content data VCNT1_1, VCNT1_2, ..., VCNT1_n.

First, the encryption processing unit 116 obtains the n content keys CK_1, CK_2, ..., CK_n from the content key holding unit 103.

Next, the encryption processing unit 116 encrypts each of the n pieces of evidence embedded content data VCNT1_1, VCNT1_2, ..., VCNT1_n using, as an encryption key, a different one of the n content keys CK_1, CK_2, ..., CK_n.

More specifically, the encryption processing unit 116 generates encrypted first content data ECNT1_1 by encrypting evidence embedded content data VCNT1_1, using content key CK_1 as the encryption key. With respect to the cases where i=2, 3, ..., n, the encryption processing unit 116 generates encrypted first content data ECNT1_2, ECNT1_3, ..., ECNT1_n, in a similar manner. It is presumed that the encryption algorithm used by the encryption processing unit 116 here is the AES (Advanced Encryption Standard) algorithm for the common key block encryption.

The encryption processing unit 116 outputs the generated n pieces of encrypted first content data ECNT1_1, ECNT1_2, ..., ECNT1_n to the third transmission control unit 119.

(17) Input Unit 117

The input unit 117 is achieved by, for example, a button, and receives transfer request information, which is a request for transferring content data to the reception device 20, when the button is operated by the user. Upon receiving the transfer request information, the input unit 117 outputs transfer destination device identifier request information REQ4 to the transfer destination device identifier obtaining unit 115.

(18) Transmission/Reception Unit 118

The transmission/reception unit 118, which is connected to the transmission/reception unit 211 in the reception device 20 via the cable 60, transmits data to the reception device 20 in accordance with requests from the first transmission control unit 105, the second transmission control unit 106, and the third transmission control unit 119.

The transmission/reception unit 118 also receives data transmitted from the reception device 20.

(19) Third Transmission Control Unit 119

The third transmission control unit 119, upon receiving the content transfer request REQ from the second transmission control unit 106, first obtains first content data CNT1 from the first content data holding unit 109. Next, the third transmission control unit 119 outputs the first content data CNT1 to the content copying unit 110, and obtains the n copies of first content data CNT1_1, CNT1_2, . . . , CNT1_n, from the content copying unit 110.

Following this, the third transmission control unit 119 outputs the n pieces of first content data CNT1_1, CNT1_2, . . . , CNT1_n to the device identifier embedding unit 111, and obtains the n pieces of device identifier embedded content data DCNT1_1, DCNT1_2, . . . , DCNT1_n in each of which the transfer source device identifier ID_1 and the transfer destination device identifier ID_2 are embedded as the electronic watermark.

Following this, the third transmission control unit 119 outputs the n pieces of device identifier embedded content data DCNT1_1, DCNT1_2, . . . , DCNT1_n to the hash embedding unit 112, and obtains the n pieces of hash embedded content data HCNT1_1, HCNT1_2, . . . , HCNT1_n in which, respectively, content key hashes HCK_1, HCK_2, . . . , HCK_n have additionally been embedded as the electronic watermark.

Following this, the third transmission control unit 119 outputs the n pieces of hash embedded content data HCNT1_1, HCNT1_2, . . . , HCNT1_n to the evidence embedding unit 113, and obtains the n pieces of evidence embedded content data VCNT1_1, VCNT1_2, . . . , VCNT1_n in which, respectively, the evidence information EV has additionally been embedded as the electronic watermark.

Following this, the third transmission control unit 119 outputs the content encryption request AESE and the n pieces of evidence embedded content data VCNT1_1, VCNT1_2, . . . , VCNT1_n to the encryption processing unit 116, and obtains, from the encryption processing unit 116, the n pieces of encrypted first content data ECNT1_1, ECNT1_2, . . . , ECNT1_n that are encrypted evidence-embedded content data.

Figure 9:
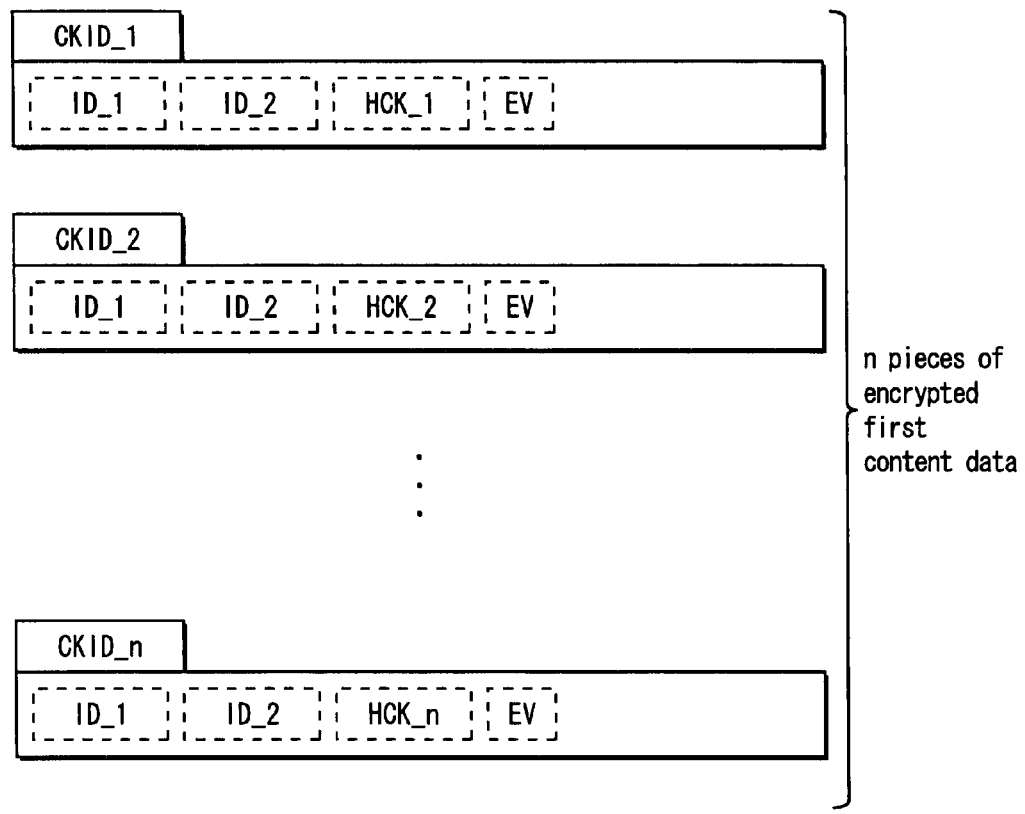
FIG. 9 shows the encrypted first content data transmitted from the transmission device 10 to the reception device 20.

The third transmission control unit 119 transmits n pairs of encrypted first content data and content key identifier, which is an identifier of a content key that was used for generating, by encryption, the encrypted first content data: (CKID_1, ECNT1_1), (CKID_2,ECNT1_2), . . . , (CKID_n, ECNT1_n), to the reception device 20 via the transmission/reception unit 118, as shown in FIG. 9.

2. Reception Device 20

Figure 10:
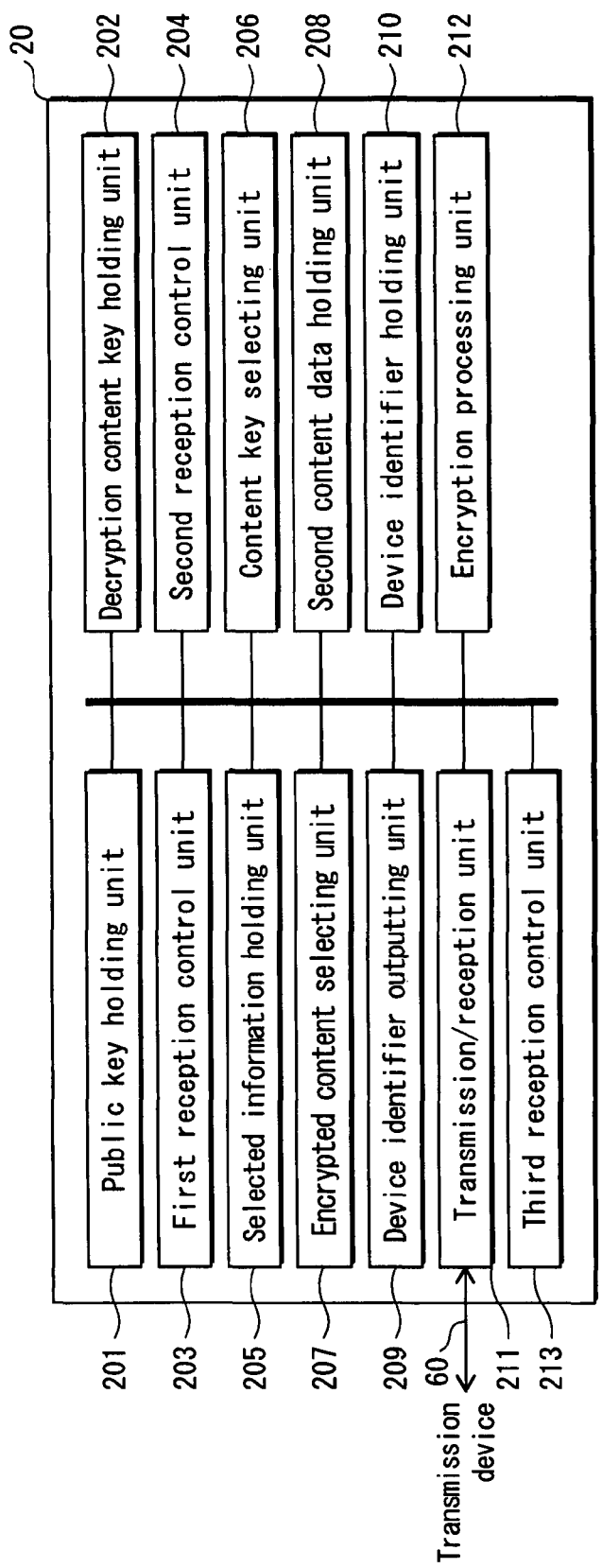
FIG. 10 is a block diagram showing the structure of the reception device 20.

FIG. 10 is a block diagram showing the structure of the reception device 20. As shown in FIG. 10, the reception device 20 includes a public key holding unit 201, a decryption content key holding unit 202, a first reception control unit 203, a second reception control unit 204, a selected information holding unit 205, a content key selecting unit 206, an encrypted content selecting unit 207, a second content data holding unit 208, a device identifier outputting unit 209, a device identifier holding unit 210, a transmission/reception unit 211, an encryption processing unit 212, and a third reception control unit 213.

The reception device 20 is more specifically a computer system including a microprocessor, a ROM, a RAM, a hard disk unit and the like. A computer program is recorded in the ROM, the RAM or the hard disk unit. The reception device 20 achieves its functions as the microprocessor operates in accordance with the computer program.

Each block constituting the reception device 20 may be structured by either hardware or software.

Now, each block constituting the reception device 20 will be described.

(1) Public Key Holding Unit 201

Figure 11:
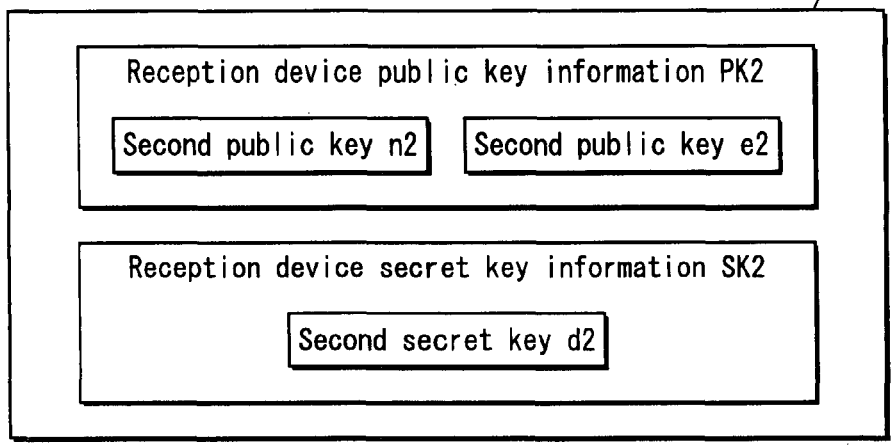
FIG. 11 shows information held by the public key holding unit 201.

The public key holding unit 201, as shown in FIG. 11, holds reception device public key information PK2 and reception device secret key information SK2.

The PK2 is composed of a second public key n2 and a second public key e2 that are public keys generated by the RSA. The reception device secret key information SK2 is composed of a second secret key d2 that is a secret key generated by the RSA.

These key information are calculated by the system manager and are stored into the public key holding unit 201 when the reception device 20 is manufactured. The second public keys n2 and e2 and the second secret key d2 are generated in the same manner as the first public keys n1 and e1 and the first secret key d1 for the transmission device 10. It should be noted here that in generating the second public keys, prime numbers p2 and q2, which are different from the prime numbers p1 and q1 used for generating the first public keys, are selected for use.

(2) Decryption Content Key Holding Unit 202

Figure 12:
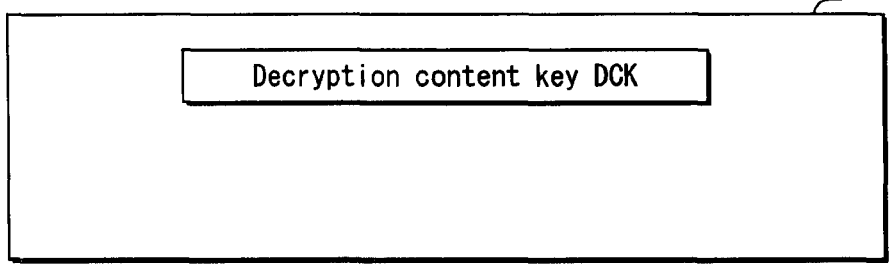
FIG. 12 shows information held by the decryption content key holding unit 202.

The decryption content key holding unit 202, as shown in FIG. 12, holds a decryption content key DCK.

(3) First Reception Control Unit 203

The first reception control unit 203, upon receiving the n pairs of content key identifier and first encrypted content key {(CKID_1,ECK_1), (CKID_2,ECK_2), . . . , (CKID_n, ECK_n)} shown in FIG. 8 from the transmission device 10 via the transmission/reception unit 211, outputs the received n pairs of content key identifier and first encrypted content key to the content key selecting unit 206. The first reception control unit 203 then receives, from the content key selecting unit 206, a pair of selected content key identifier SCKID and selected first encrypted content key SECK.

The first reception control unit 203 stores the selected content key identifier SCKID into the selected information holding unit 205, and outputs the selected first encrypted content key SECK and the RSA encryption process request RSAE to the encryption processing unit 212. The first reception control unit 203 then receives, from the encryption processing unit 212, the second encrypted content key E2CK that is encrypted data.

The first reception control unit 203 transmits the second encrypted content key E2CK to the transmission device 10 via the transmission/reception unit 211.

(4) Second Reception Control Unit 204

The second reception control unit 204, upon receiving a piece of third encrypted content key E3CK from the transmission device 10 via the transmission/reception unit 211, outputs the third encrypted content key E3CK and the RSA decryption process request RSAD to the encryption processing unit 212. The second reception control unit 204 then receives, from the encryption processing unit 212, a decryption content key DCK that is data obtained by decrypting the third encrypted content key E3CK. The second reception control unit 204 stores the decryption content key DCK into the decryption content key holding unit 202.

(5) Selected Information Holding Unit 205

Figure 13:
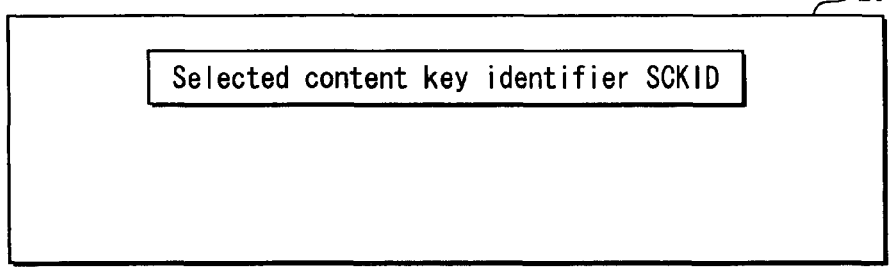
FIG. 13 shows information held by the selected information holding unit 205.

The selected information holding unit 205, as shown in FIG. 13, holds the selected content key identifier SCKID.

(6) Content Key Selecting Unit 206

The content key selecting unit 206, upon receiving the n pairs of content key identifier and first encrypted content key {(CKID_1,ECK_1), (CKID_2,ECK_2), . . . , (CKID_n, ECK_n)} from the first reception control unit 203, selects a pair of content key identifier and first encrypted content from among the received pairs. Here, one pair is selected from the n pairs by, for example, generating a random number that is n or lower, and selecting a pair based on the generated random number.

In the following description, the selected content key identifier is referred to as a selected content key identifier SCKID_s (s=any of 1, 2, . . . , n) and the selected first encrypted content key referred to as a selected first encrypted content key SECK_s (s=any of 1, 2, . . . , n).

The content key selecting unit 206 outputs the selected content key identifier SCKID and the selected first encrypted content key SECK to the first reception control unit 203.

(7) Encrypted Content Selecting Unit 207

The encrypted content selecting unit 207, upon receiving the n pairs of content key identifier and encrypted first content data (CKID_1,ECNT1_1), (CKID_2,ECNT1_2), . . . , (CKID_n,ECNT1_n) from the third reception control unit 213, first obtains the selected content key identifier SCKID from the selected information holding unit 205.

The encrypted content selecting unit 207 then extracts, from among the n pieces of content key identifiers CKID_1, CKID_2, . . . , CKID_n, one whose value matches the value of the selected content key identifier SCKID. In the following description, a piece of encrypted first content data that corresponds to the content key identifier, whose value matches the value of the selected content key identifier SCKID, is represented as SECNT1.

After this, the encrypted content selecting unit 207 outputs the selected content key identifier SCKID and the encrypted first content data SECNT1 to the third reception control unit 213.

(8) Second Content Data Holding Unit 208

Figure 14:
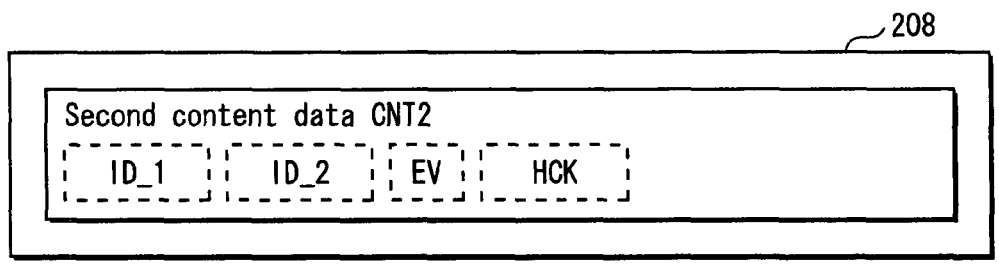
FIG. 14 shows information held by the second content data holding unit 208.

The second content data holding unit 208, as shown in FIG. 14, holds second content data CNT2. As shown in FIG. 14, the transfer source device identifier ID_1, the transfer destination device identifier ID_2, the evidence information EV, and the content key hash HCK are embedded, as the electronic watermark, in the second content data CNT2.

(9) Device Identifier Outputting Unit 209

The device identifier outputting unit 209, upon receiving the transfer destination device identifier obtaining request information REQ5 from the transmission device 10 via the transmission/reception unit 211, obtains the device identifier ID_2 from the device identifier holding unit 210. The device identifier outputting unit 209 outputs the obtained device identifier ID_2 to the transmission device 10 via the transmission/reception unit 211.

(10) Device Identifier Holding Unit 210

Figure 15:
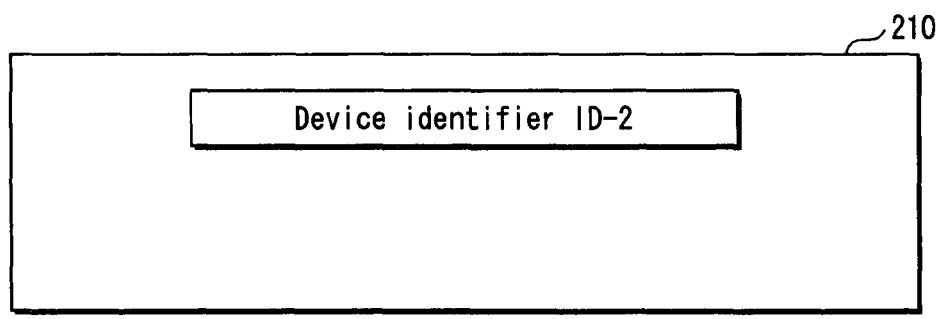
FIG. 15 shows information held by the device identifier holding unit 210.

The device identifier holding unit 210, as shown in FIG. 15, holds the device identifier ID_2. The device identifier ID_2 is information for identifying the reception device 20, is an invariable value, is provided preliminarily when the reception device 20 is manufactured, and is stored in the device identifier holding unit 210.

(11) Transmission/Reception Unit 211

The transmission/reception unit 211, which is connected to the transmission/reception unit 118 in the transmission device 10 via the cable 60, transmits data to the transmission device 10 in accordance with requests from the first reception control unit 203 and the second reception control unit 204.

The transmission/reception unit 211 also receives data transmitted from the transmission device 10.

(12) Encryption Processing Unit 212

The encryption processing unit 212 performs the following encryption processes.

(a) Upon Receiving RSA Encryption Process Request RSAE from First Reception Control Unit 203

The encryption processing unit 212 generates an encrypted text by encrypting the selected first encrypted content key SECK in the following procedures.

First, the encryption processing unit 212 obtains the second public keys n2 and e2 from the reception device public key information PK2 stored in the public key holding unit 201.

Next, the encryption processing unit 212 performs the RSA encryption process to encrypt the selected first encrypted content key SECK using the second public keys n2 and e2. Here, when the original message is the selected first encrypted content key SECK, the encrypted text thereof is represented as SECK^e2 (mod n2). The encrypted text SECK^e2 (mod n2) of the selected first encrypted content key SECK is used as the second encrypted content key E2CK. The RSA encryption process has already been explained in regards with the transmission device 10, and description of the process is omitted here.

The encryption processing unit 212 then outputs the second encrypted content key E2CK to the second reception control unit 204.

(b) Upon Receiving RSA Decryption Process Request RSAD from Second Reception Control Unit 204

The encryption processing unit 212 generates a decrypted text by decrypting the third encrypted content key E3CK in the following procedures.

First, the encryption processing unit 212 obtains, from the public key holding unit 201, the second public key n2, which is contained in the reception device public key information PK2, and the second secret key d2 which is contained in the reception device secret key information SK2.

Next, the encryption processing unit 212 performs the RSA decryption process to decrypt the third encrypted content key E3CK using the second public key n2 and the second secret key d2. The decrypted text obtained by decrypting the third encrypted content key E3CK is referred to as decryption content key DCK. The RSA decryption process has already been explained with regard to the transmission device 10, and description of the process is omitted here.

The encryption processing unit 212 then outputs the decryption content key DCK to the second reception control unit 204.

(c) Upon Receiving Content Decryption Request AESD from Third Reception Control Unit 213

The encryption processing unit 212 performs the decryption process to decrypt the encrypted first content data SECNT1 using the received decryption content key DCK. Here, the encryption processing unit 212 uses, as the decryption algorithm, the encryption algorithm AES that is used by the transmission device 10 to generate the encrypted first content data.

The encryption processing unit 212 then outputs decrypted content DCNT, which is obtained by decrypting the encrypted first content data SECNT1, to the third reception control unit 213.

(13) Third Reception Control Unit 213

The third reception control unit 213 receives the n pairs of content key identifier and encrypted first content data (CKID_1,ECNT1_1), (CKID_2,ECNT1_2), . . . , (CKID_n,ECNT1_n) from the transmission device 10 via the transmission/reception unit 211.

First, the third reception control unit 213 outputs the n pairs of content key identifier and encrypted first content data (CKID_1,ECNT1_1), (CKID_2,ECNT1_2), . . . , (CKID_n,ECNT1_n) to the encrypted content selecting unit 207, and obtains, from the encrypted content selecting unit 207, a pair of selected content key identifier SCKID and encrypted first content data SECNT1.

Next, the third reception control unit 213 obtains the decryption content key DCK from the decryption content key holding unit 202.

The third reception control unit 213 then outputs the content decryption request AESD, encrypted first content data SECNT1, and decryption content key DCK to the encryption processing unit 212, and obtains decrypted content data DCNT from the encryption processing unit 212.

The third reception control unit 213 then stores the decrypted content data DCNT, as the second content data CNT2, into the second content data holding unit 208.

3. Unauthentic Content Source Identifying Device 30

Figure 16:
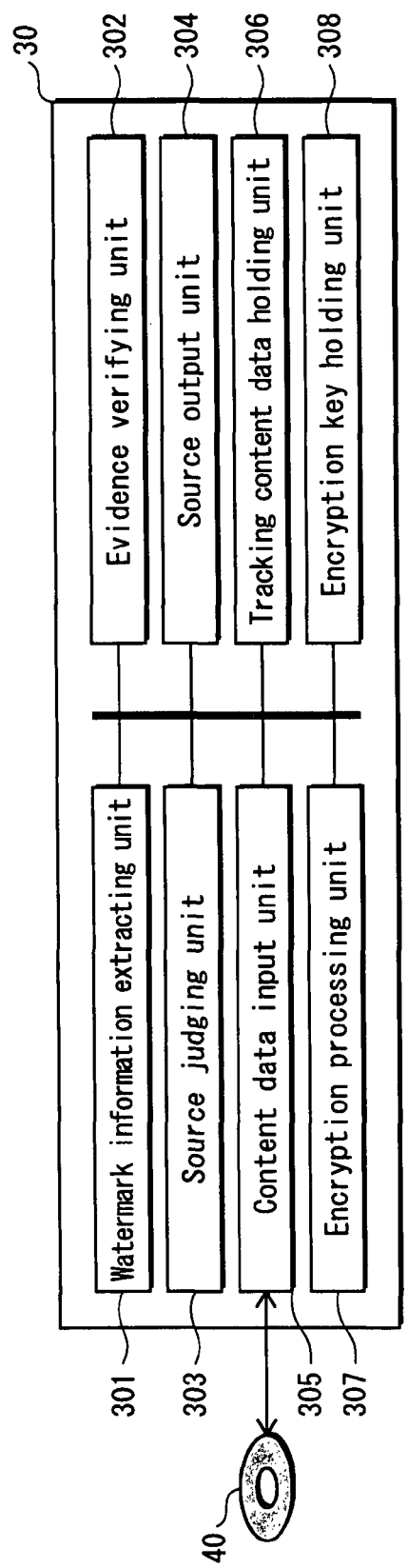
FIG. 16 is a block diagram showing the structure of the unauthentic content source identifying device 30.

FIG. 16 is a block diagram showing the structure of the unauthentic content source identifying device 30. As shown in FIG. 16, the unauthentic content source identifying device 30 includes a watermark information extracting unit 301, an evidence verifying unit 302, a source judging unit 303, a source output unit 304, a content data input unit 305, a tracking content data holding unit 306, an encryption processing unit 307, and an encryption key holding unit 308.

The unauthentic content source identifying device 30 is more specifically a computer system including a microprocessor, a ROM, a RAM, a hard disk unit and the like. A computer program is recorded in the ROM, the RAM or the hard disk unit. The unauthentic content source identifying device 30 achieves its functions as the microprocessor operates in accordance with the computer program.

Each block constituting the unauthentic content source identifying device 30 may be structured by either hardware or software.

Now, each block constituting the unauthentic content source identifying device 30 will be described.

(1) Watermark Information Extracting Unit 301

The watermark information extracting unit 301, upon receiving a watermark information extraction request from the content data input unit 305, obtains tracking content data TCNT from the tracking content data holding unit 306.

The watermark information extracting unit 301 extracts an electronic watermark that has been embedded in the obtained tracking content data TCNT. The technology for extracting an electronic watermark is well known, and description thereof is omitted.

The watermark information extracting unit 301 extracts, from the tracking content data TCNT, the transfer source device identifier ID_1, transfer destination device identifier ID_2, evidence information EV, and content key hash HCK from the tracking content data TCNT, and outputs the extracted information to the evidence verifying unit 302.

(2) Evidence Verifying Unit 302

The evidence verifying unit 302, upon receiving the transfer source device identifier ID_1, transfer destination device identifier ID_2, evidence information EV, and content key hash HCK from the watermark information extracting unit 301, outputs the transfer destination device identifier ID_2, evidence information EV, and RSA decryption process request RSAD to the encryption processing unit 307 so that the RSA decryption process is performed to decrypt the evidence information EV.

The evidence verifying unit 302 then receives decrypted evidence information DEV from the encryption processing unit 307. Following this, the evidence verifying unit 302 outputs the hash value calculation request HASH and decrypted evidence information DEV to the encryption processing unit 307 so that the hash value for the decrypted evidence information DEV is calculated. The evidence verifying unit 302 then receives a decrypted evidence information hash HDEV, which is a hash value for the decrypted evidence information, from the encryption processing unit 307.

The evidence verifying unit 302 compares the value of the decrypted evidence information hash HDEV with the value of the content key hash HCK to judge whether they are equal.

If the value of the decrypted evidence information hash HDEV is equal to the value of the content key hash HCK, the evidence verifying unit 302 sets an evidence authenticity flag FLAG to "1", and outputs the transfer source device identifier ID_1, transfer destination device identifier ID_2, and evidence authenticity flag FLAG to the source judging unit 303.

On the other hand, if the value of the decrypted evidence information hash HDEV is different from the value of the content key hash HCK, the evidence verifying unit 302 sets the evidence authenticity flag FLAG to "0", and outputs the transfer source device identifier ID_1, transfer destination device identifier ID_2, and evidence authenticity flag FLAG to the source judging unit 303.

(3) Source Judging Unit 303

The source judging unit 303 receives the transfer source device identifier ID_1, transfer destination device identifier ID_2, and evidence authenticity flag FLAG from the evidence verifying unit 302.

If the received evidence authenticity flag FLAG has been set to "1", the source judging unit 303 outputs the transfer destination device identifier ID_2 to the source output unit 304, as an unauthentic content source device identifier.

On the other hand, if the received evidence authenticity flag FLAG has been set to "0", the source judging unit 303 outputs the transfer source device identifier ID_1 to the source output unit 304, as the unauthentic content source device identifier.

(4) Source Output Unit 304

The source output unit 304 is provided with a display, and performs processes such as generating screen information that is to be output to the display.

Upon receiving the unauthentic content source device identifier from the source judging unit 303, the source output unit 304 generates screen information for displaying the received unauthentic content source device identifier, and outputs the generated screen information to the display.

(5) Content Data Input Unit 305

The content data input unit 305 is more specifically a DVD drive unit, and reads content data from the recording medium 40 being a DVD-RAM. The content data input unit 305 inputs the read content data into the tracking content data holding unit 306, as the tracking content data TCNT.

After this, the content data input unit 305 outputs a watermark information extraction request to the watermark information extracting unit 301.

Here, the recording medium 40 is a recording medium in which a pirated content generated by an unauthorized copying has been recorded.

(6) Tracking Content Data Holding Unit 306

Figure 17:
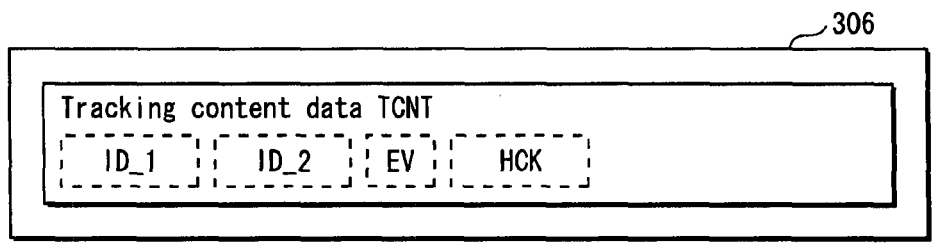
FIG. 17 shows information held by the tracking content data holding unit 306.

The tracking content data holding unit 306, as shown in FIG. 17, holds tracking content data TCNT. As shown in FIG. 17, the transfer source device identifier ID_1, the transfer destination device identifier ID_2, the evidence information EV, and the content key hash HCK are embedded, as the electronic watermark, in the tracking content data TCNT.

(7) Encryption Processing Unit 307

The encryption processing unit 307 performs the following encryption processes.

(a) Upon Receiving RSA Decryption Process Request RSAD from Second Transmission Control Unit 106

The encryption processing unit 307 generates a decrypted text by decrypting the evidence information EV in the following procedures.

First, the encryption processing unit 307 searches the encryption key holding unit 308 and obtains key information SK_2 that is associated with a device identifier that is identical to the transfer destination device identifier ID_2 received from the evidence verifying unit 302. The encryption processing unit 307 then performs the RSA decryption process to decrypt the evidence information EV using the public key n2 and the secret key d2 contained in the key information SK_2.

In the RSA decryption process, a decrypted text "C^dj (mod nj)" is obtained, where C denotes an encrypted text, nj denotes a public key, and dj denotes a secret key. Accordingly, the encryption processing unit 307 obtains a decrypted text EV^d2 (mod n2) by decrypting the evidence information EV.

The encryption processing unit 307 outputs the decrypted text EV^d2 (mod n2), which is obtained by decrypting the evidence information EV, to the evidence verifying unit 302, as the decrypted evidence information DEV.

(b) Upon Receiving Hash Value Calculation Request HASH from Evidence Verifying Unit 302

The encryption processing unit 307 obtains, by performing a calculation, the decrypted evidence information hash HDEV which is a hash value corresponding to the decrypted evidence information DEV.

As described earlier, the hash value is obtained as an output value when data is input into a hash function. The encryption processing unit 307 uses, as the hash function algorithm, the same algorithm as the encryption processing unit 116 of the transmission device 10.

(8) Encryption Key Holding Unit 308

Figure 18:
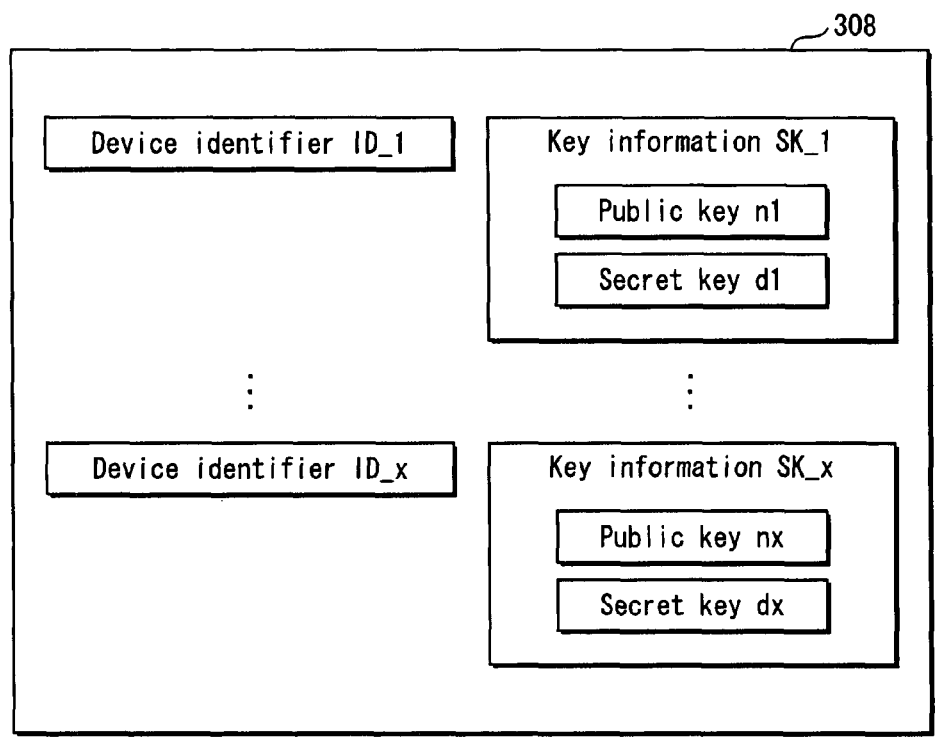
FIG. 18 shows information held by the encryption key holding unit 308.

The encryption key holding unit 308, as shown in FIG. 18, holds a plurality of device identifiers and a plurality of pieces of key information, in correspondence with each other.

Each piece of key information is composed of a public key and a secret key which are identical with a public key and a secret key held by a device that is identified by a device identifier corresponding to the piece of key information itself.

<Operation>

1. Overall System Operation

Figure 19:
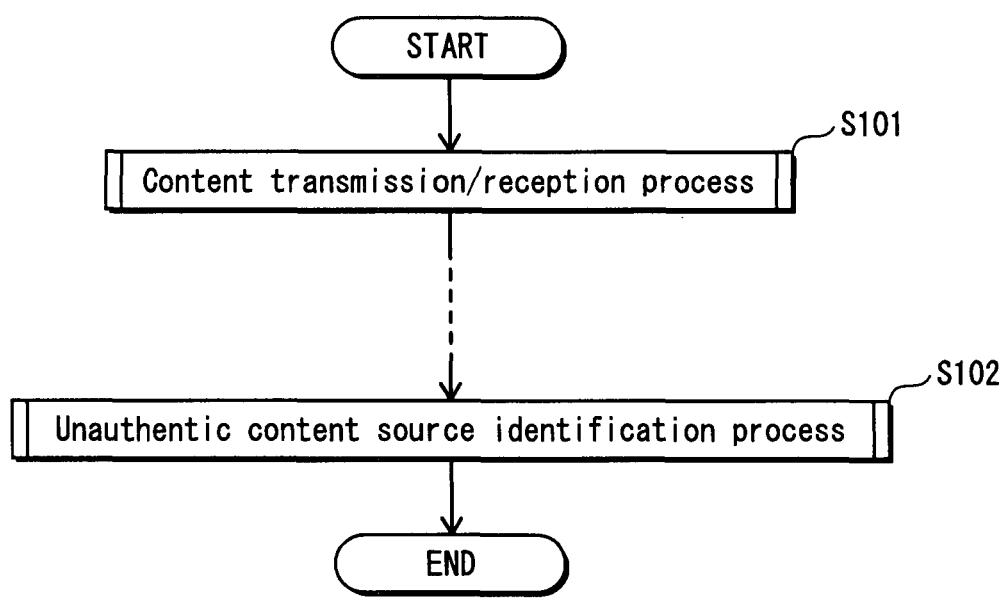
FIG. 19 is a flowchart showing the operation of the content distribution system 1.

FIG. 19 is a flowchart showing the overall operation of the content distribution system 1.

First, the content distribution system 1 performs a content transmission/reception process between the transmission device 10 and the reception device 20 (step S101).

If a pirated content is found to be distributed in the market, the content distribution system 1 performs an unauthentic content source identification process (step S102).

2. Operation of Content Transmission/Reception Process

Figure 20:
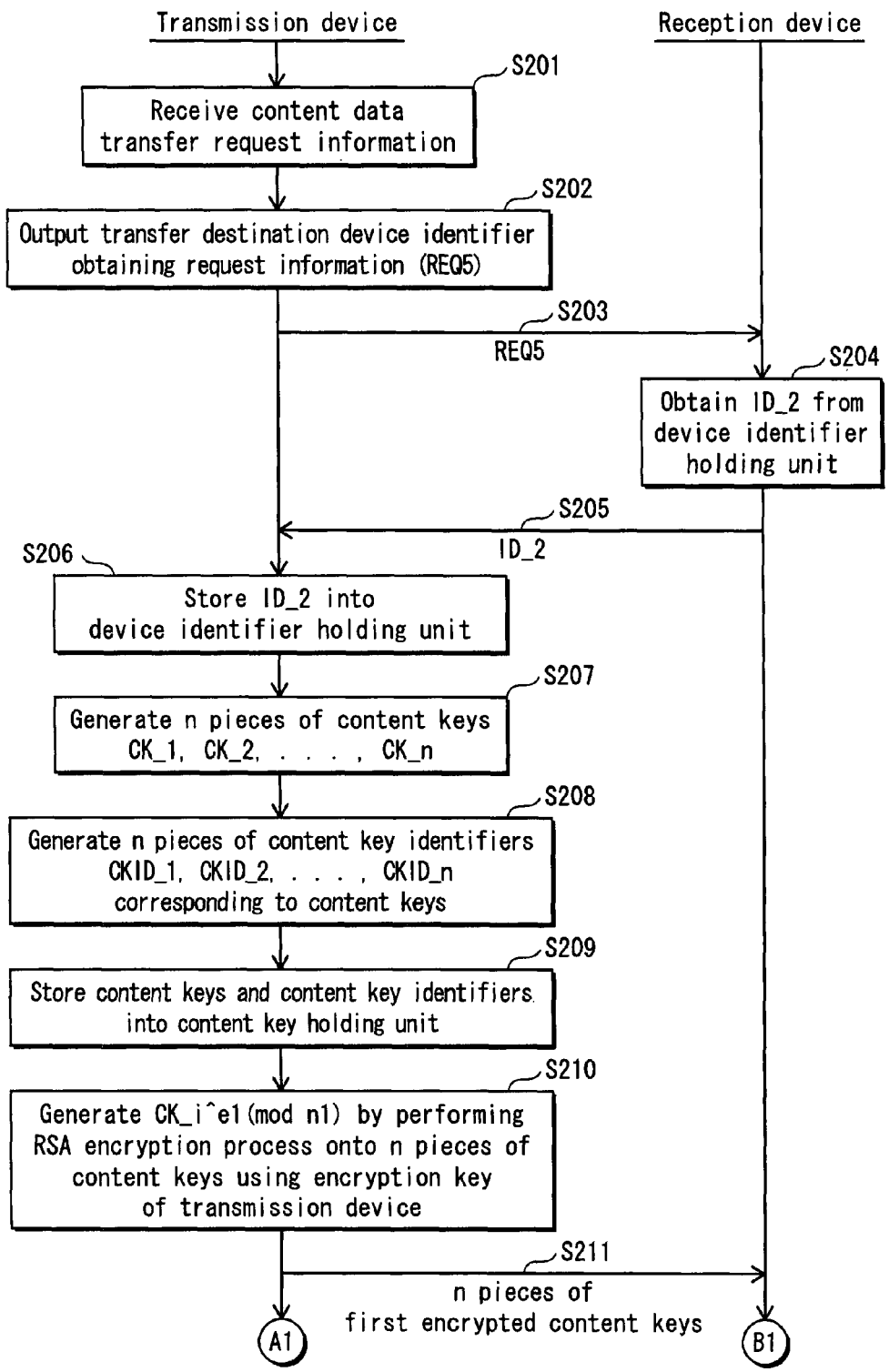
FIG. 20 is a flowchart showing the operation of the content transmission/reception process in Embodiment 1, continued to FIG. 21.
Figure 21:
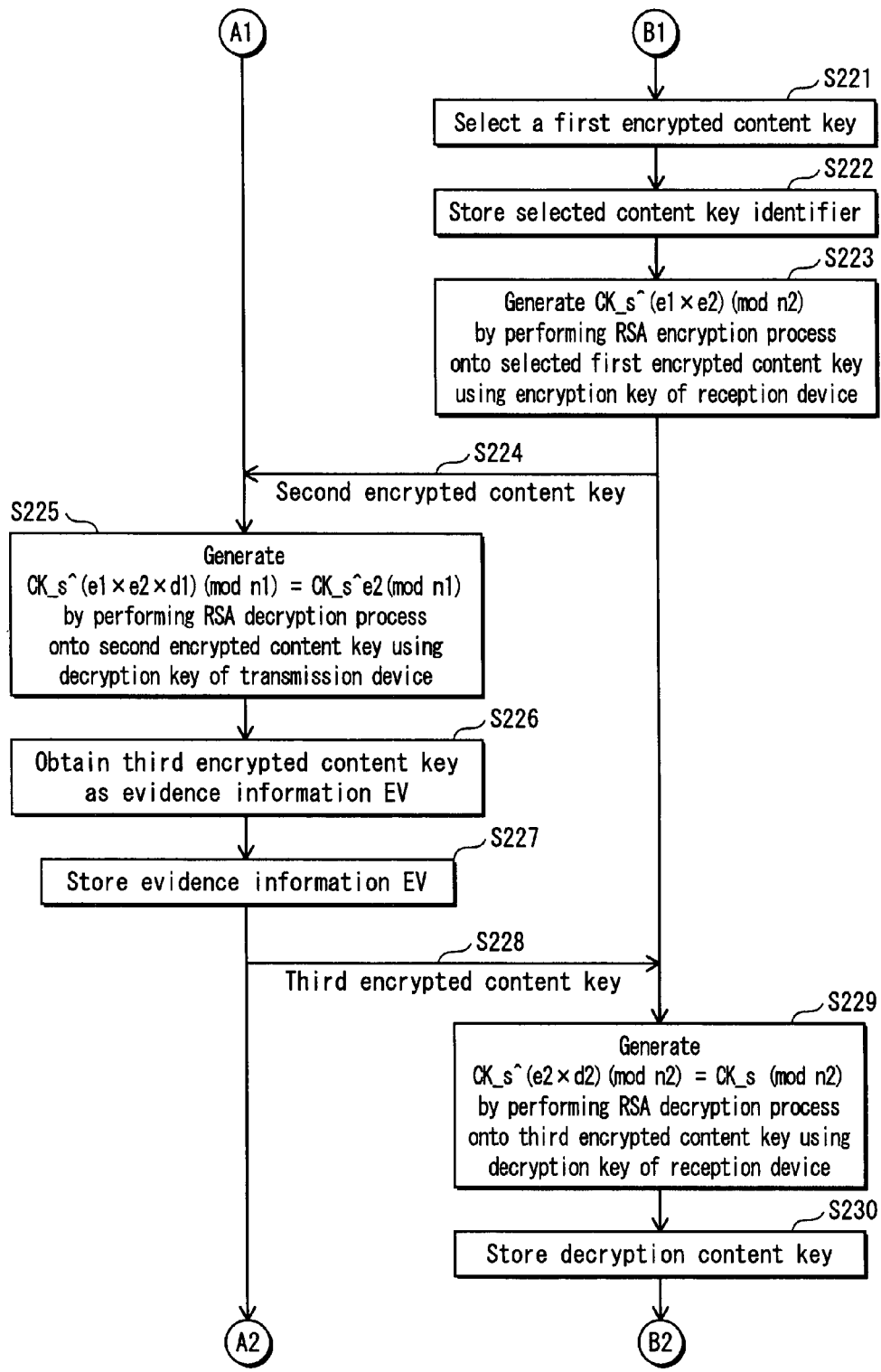
FIG. 21 is a flowchart showing the operation of the content transmission/reception process in Embodiment 1, continued to FIG. 22.
Figure 22:
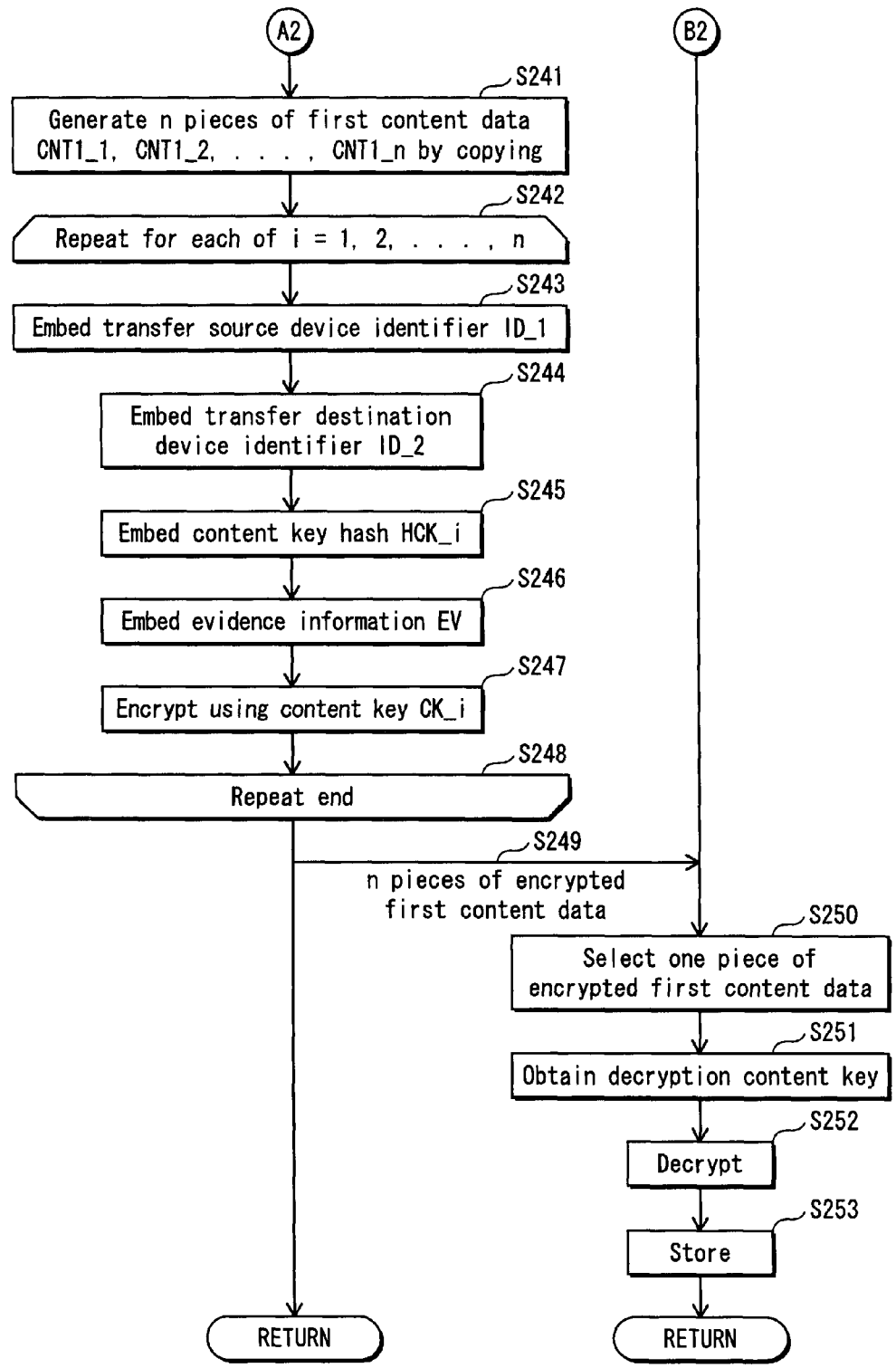
FIG. 22 is a flowchart showing the operation of the content transmission/reception process in Embodiment 1.

FIGS. 20 through 22 are flowcharts showing the operation of the content transmission/reception process, which is a detail of step S101 shown in FIG. 19.

Upon receiving a content transfer request information from the user (step S201), the input unit 117 of the transmission device 10 outputs transfer destination device identifier request information REQ4 to the transfer destination device identifier obtaining unit 115 (step S202).

Upon receiving the transfer destination device identifier request information, the transfer destination device identifier obtaining unit 115 transmits transfer destination device identifier obtaining request information REQ5 to the reception device 20 via the transmission/reception unit 118, and the transmission/reception unit 211 of the reception device 20 receives the transfer destination device identifier obtaining request information REQ5 (step S203).

The device identifier outputting unit 209 of the reception device 20, upon receiving the transfer destination device identifier obtaining request information REQ5 from the transmission device 10 via the transmission/reception unit 211, obtains the device identifier ID_2 from the device identifier holding unit 210 (step S204).

The device identifier outputting unit 209 outputs the obtained device identifier ID_2 to the transmission device 10 via the transmission/reception unit 211 as the transfer destination device identifier, and the transmission/reception unit 118 of the transmission device 10 receives the transfer destination device identifier ID_2 (step S205).

The transfer destination device identifier obtaining unit 115, upon receiving the transfer destination device identifier ID_2 via the transmission/reception unit 118, stores it into the device identifier holding unit 114 (step S206). The transfer destination device identifier obtaining unit 115 then outputs content key generation request REQ1 to the content key generating unit 101.

Upon receiving the content key generation request REQ1 from the transfer destination device identifier obtaining unit 115, the content key generating unit 101 generates n 128-bit content keys CK_1, CK_2, . . . , CK_n, where "n" is a predetermined integer of 2 or higher (step S207). The content key generating unit 101 then outputs the generated n content keys CK_1, CK_2, . . . , CK_n to the content key identifier generating unit 102.

The content key identifier generating unit 102, upon receiving the n content keys CK_1, CK_2, . . . , CK_n from the content key generating unit 101, generates content key identifiers CKID_1, CKID_2, . . . , CKID_n that identify the content keys, respectively (step S208).

The content key identifier generating unit 102 stores the n content keys CK_1, CK_2, . . . , CK_n and the n content key identifiers CKID_1, CKID_2, . . . , CKID_n into the content key holding unit 103 by associating each of the keys with a corresponding one of the identifiers (step S209). The content key identifier generating unit 102 then outputs first transmission control start request REQ2 to the first transmission control unit 105.

The first transmission control unit 105, upon receiving the first transmission control start request REQ2 from the content key identifier generating unit 102, first obtains the n pairs of content key identifier and content key {(CKID_1,CK_1), (CKID_2,CK_2), . . . , (CKID_n,CK_n)} from the content key holding unit 103.

The first transmission control unit 105 then outputs the n content keys and RSA encryption process request RSAE to the encryption processing unit 116.

The encryption processing unit 116 first obtains the first public keys n1 and e1 from the transmission device public key information PK1 stored in the public key holding unit 104. Next, the encryption processing unit 116 performs the RSA encryption process to encrypt each of the n content keys CK_1, CK_2, . . . , CK_n using the first public keys n1 and e1 (step S210). Here, more specifically, when the encrypted text of the content key CK_i is denoted as ECK_i, ECK_i=CK_i^e1 (mod n1). The encryption processing unit 116 outputs n encrypted texts ECK_1, ECK_2, . . . , ECK_n, which respectively correspond to the n pieces of content keys, to the first transmission control unit 105.

The first transmission control unit 105 receives n first encrypted content keys being encrypted data from the encryption processing unit 116, and then transmits n pairs of content key identifier and first encrypted content key {(CKID_1, ECK_1), (CKID_2,ECK_2), . . . , (CKID_n,ECK_n)} to the reception device 20 via the transmission/reception unit 118, and the transmission/reception unit 211 of the reception device 20 receives the n pairs of content key identifier and first encrypted content key (step S211).

The first reception control unit 203 of the reception device 20, upon receiving the n pairs of content key identifier and first encrypted content key {(CKID_1,ECK_1), (CKID_2, ECK_2), ..., (CKID_n,ECK_n)} from the transmission device 10 via the transmission/reception unit 211, outputs the received n pairs of content key identifier and first encrypted content key to the content key selecting unit 206.

The content key selecting unit 206, upon receiving the n pairs of content key identifier and first encrypted content key {(CKID_1,ECK_1), (CKID_2,ECK_2), ..., (CKID_n, ECK_n)} from the first reception control unit 203, selects a pair of content key identifier and first encrypted content from among the received pairs (step S221).

The first reception control unit 203 then receives, from the content key selecting unit 206, the pair of selected content key identifier SCKID and selected first encrypted content key SECK. The first reception control unit 203 stores the selected content key identifier SCKID into the selected information holding unit 205 (step S222), and then outputs the selected first encrypted content key SECK and the RSA encryption process request RSAE to the encryption processing unit 212.

The encryption processing unit 212 obtains the second public keys n2 and e2 from the reception device public key information PK2 stored in the public key holding unit 201. The encryption processing unit 212 then performs the RSA encryption process to generate the second encrypted content key E2CK by encrypting the selected first encrypted content key SECK using the second public keys n2 and e2 (step S223). Here, more specifically, the second encrypted content key E2CK=CK_s^(e1×e2)(mod n2), where s is any of 1, 2, ..., n.

The first reception control unit 203 receives the second encrypted content key E2CK from the encryption processing unit 212, and then transmits the second encrypted content key E2CK to the transmission device 10 via the transmission/reception unit 211. The transmission device 10 receives the second encrypted content key E2CK (step S224).

The second transmission control unit 106 of the transmission device 10, upon receiving the second encrypted content key E2CK from the reception device 20 via the transmission/reception unit 118, outputs the second encrypted content key E2CK and RSA decryption process request RSAD to the encryption processing unit 116.

Upon receiving the RSA decryption process request RSAD from the second transmission control unit 106, the encryption processing unit 116 first obtains the first public key n1 and the first secret key d1 from the public key holding unit 104. The encryption processing unit 116 then performs the RSA decryption process to decrypt the second encrypted content key E2CK using the first public key n1 and the first secret key d1 (step S225). Here, more specifically, the third encrypted content key E3CK=CK_s^(e1×e2×d1) (mod n1)=CK_s^e2 (mod n1). The encryption processing unit 116 outputs the third encrypted content key E3CK to the second transmission control unit 106.

The second transmission control unit 106 receives, from the encryption processing unit 116, the third encrypted content key E3CK that is data obtained by decrypting the second encrypted content key E2CK, and then outputs the third encrypted content key E3CK to the evidence obtaining unit 107.

The evidence obtaining unit 107 obtains, from the second transmission control unit 106, the third encrypted content key E3CK as evidence information EV (step S226), and stores the evidence information EV into the evidence holding unit 108 (step S227).

The second transmission control unit 106 then transmits the third encrypted content key E3CK to the reception device 20 via the transmission/reception unit 118, and the transmission/reception unit 211 of the reception device 20 receives the third encrypted content key E3CK (step S228). On the other hand, the second transmission control unit 106 outputs the content transfer request REQ3 to the third transmission control unit 119.

The second reception control unit 204 of the reception device 20, upon receiving a piece of third encrypted content key E3CK from the transmission device 10 via the transmission/reception unit 211, outputs the third encrypted content key E3CK and the RSA decryption process request RSAD to the encryption processing unit 212.

Upon receiving the RSA decryption process request, the encryption processing unit 212 first obtains the second public key n2 and the second secret key d2 from the public key holding unit 201, and then generates the decryption content key DCK by performing the RSA decryption process to decrypt the third encrypted content key E3CK using the second public key n2 and the second secret key d2 (step S229). Here, more specifically, the decryption content key DCK=CK_s^(e2×d2) (mod n2)=CK_s (mod n2). The encryption processing unit 212 then outputs the decryption content key DCK to the second reception control unit 204.

The second reception control unit 204 receives the decryption content key DCK from the encryption processing unit 212, and stores the received decryption content key DCK into the decryption content key holding unit 202 (step S230).

The third transmission control unit 119, upon receiving the content transfer request REQ from the second transmission control unit 106, first obtains first content data CNT1 from the first content data holding unit 109. Next, the third transmission control unit 119 outputs the first content data CNT1 to the content copying unit 110.

The content copying unit 110, upon receiving the first content data CNT1 from the third transmission control unit 119, generates n pieces of first content data CNT1_1, CNT1_2, ..., CNT1_n, each of which has the same content as the first content data CNT1, by copying the first content data CNT1 (step S241). The content copying unit 110 outputs the generated n pieces of first content data CNT1_1, CNT1_2, ..., CNT1_n to the third transmission control unit 119.

After the third transmission control unit 119 obtains the n pieces of first content data CNT1_1, CNT1_2, ..., CNT1_n, the third transmission control unit 119, the device identifier embedding unit 111, the hash embedding unit 112, the evidence embedding unit 113, and the encryption processing unit 116 repeats steps S242 through S248 for each of i=1, 2, ..., n (step S242).

First, the device identifier embedding unit 111 embeds the transfer source device identifier ID_1, as the electronic watermark, into first content data CNT1_i (step S243), and embeds the transfer destination device identifier ID_2, as the electronic watermark, into first content data CNT1_i (step S244).

Following this, the hash embedding unit 112 generates hash embedded content data HCNT1_i by embedding, as the electronic watermark, content key hash HCK_i into device identifier embedded content data DCNT1_i (step S245).

The evidence embedding unit 113 then generates evidence embedded content data VCNT1_i by embedding the evidence information EV, as the electronic watermark, into hash embedded content data HCNT1_i (step S246).

Lastly in the repetition, the encryption processing unit 116 generates encrypted first content data ECNT1_i by encrypting evidence embedded content data VCNT1_i, using content key CK_i as the encryption key (step S247).

The third transmission control unit 119 receives the n pieces of encrypted first content data from the encryption processing unit 116, and then transmits n pairs of encrypted first content data and content key identifier, which is an identifier of a content key that was used for generating, by encryption, the encrypted first content data: (CKID_1,ECNT1_1), (CKID_2,ECNT1_2), ..., (CKID_n,ECNT1_n), to the reception device 20 via the transmission/reception unit 118, and the transmission/reception unit 211 of the reception device 20 receives the n pairs of encrypted first content data and content key identifier (step S249).

The third reception control unit 213 of the reception device 20 receives the n pairs of content key identifier and encrypted first content data (CKID_1,ECNT1_1), (CKID_2, ECNT1_2), ..., (CKID_n,ECNT1_n) via the transmission/reception unit 211, then outputs the n pairs of content key identifier and encrypted first content data to the encrypted content selecting unit 207.

The encrypted content selecting unit 207, upon receiving the n pairs of content key identifier and encrypted first content data from the third reception control unit 213, selects from among the n pieces of content key identifiers CKID_1, CKID_2, ..., CKID_n, one whose value matches the value of the selected content key identifier SCKID which has been obtained from the encrypted content selecting unit 207 (step S250), and outputs the selected content key identifier SCKID and encrypted first content data SECNT1 that corresponds thereto to the third reception control unit 213.

The third reception control unit 213 receives the pair of content key identifier SCKID and encrypted first content data SECNT1, and then obtains the decryption content key DCK from the decryption content key holding unit 202 (step S251).

The third reception control unit 213 then outputs the content decryption request AESD, encrypted first content data SECNT1, and decryption content key DCK to the encryption processing unit 212.

The encryption processing unit 212 generates decrypted content DCNT by decrypting the encrypted first content data SECNT1 using the decryption content key DCK as the decryption key (step S252). The encryption processing unit 212 outputs the decrypted content DCNT to the third reception control unit 213.

The third reception control unit 213, upon receiving the decrypted content DCNT from the encryption processing unit 212, stores the decrypted content data DCNT as the second content data CNT2 into the second content data holding unit 208 (step S253).

3. Operation of Unauthentic Content Source Identification Process

Figure 23:
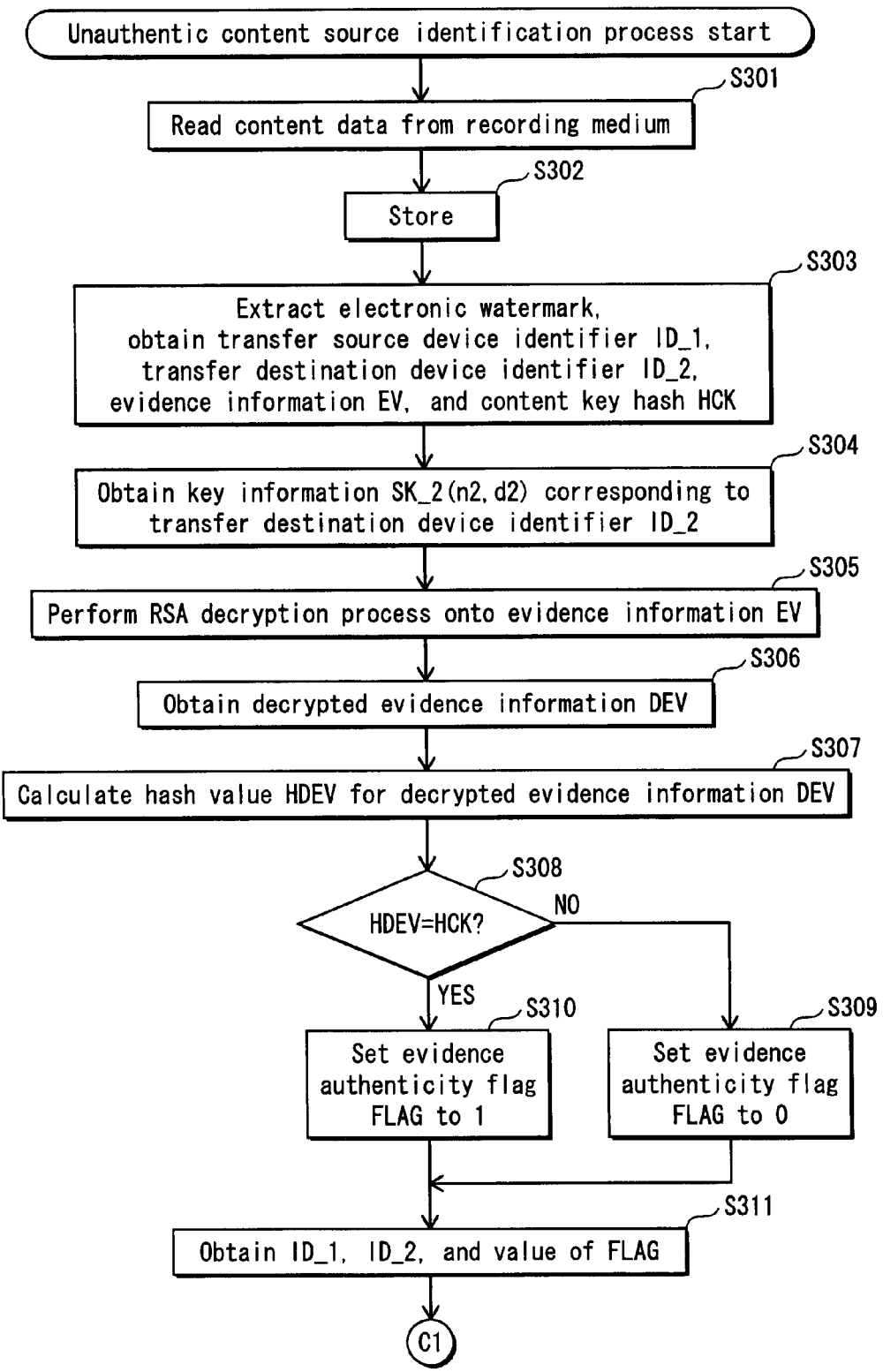
FIG. 23 is a flowchart showing the operation of the unauthentic content source identification process in Embodiment 1, continued to FIG. 24.
Figure 24:
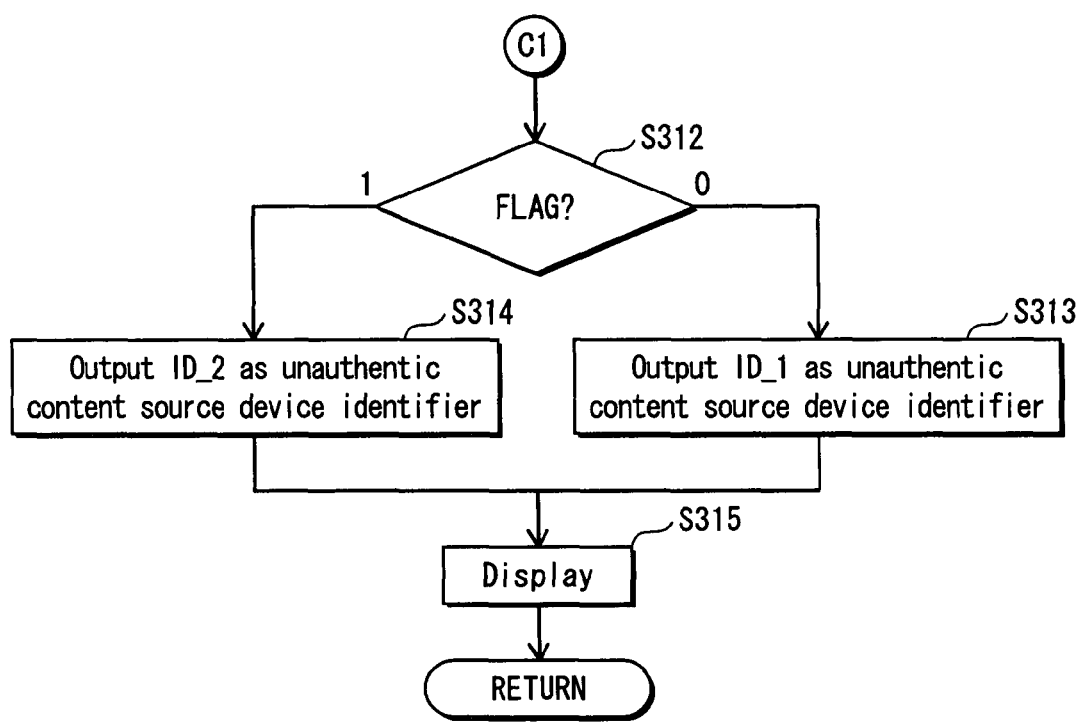
FIG. 24 is a flowchart showing the operation of the unauthentic content source identification process in Embodiment 1.
Figure 25:
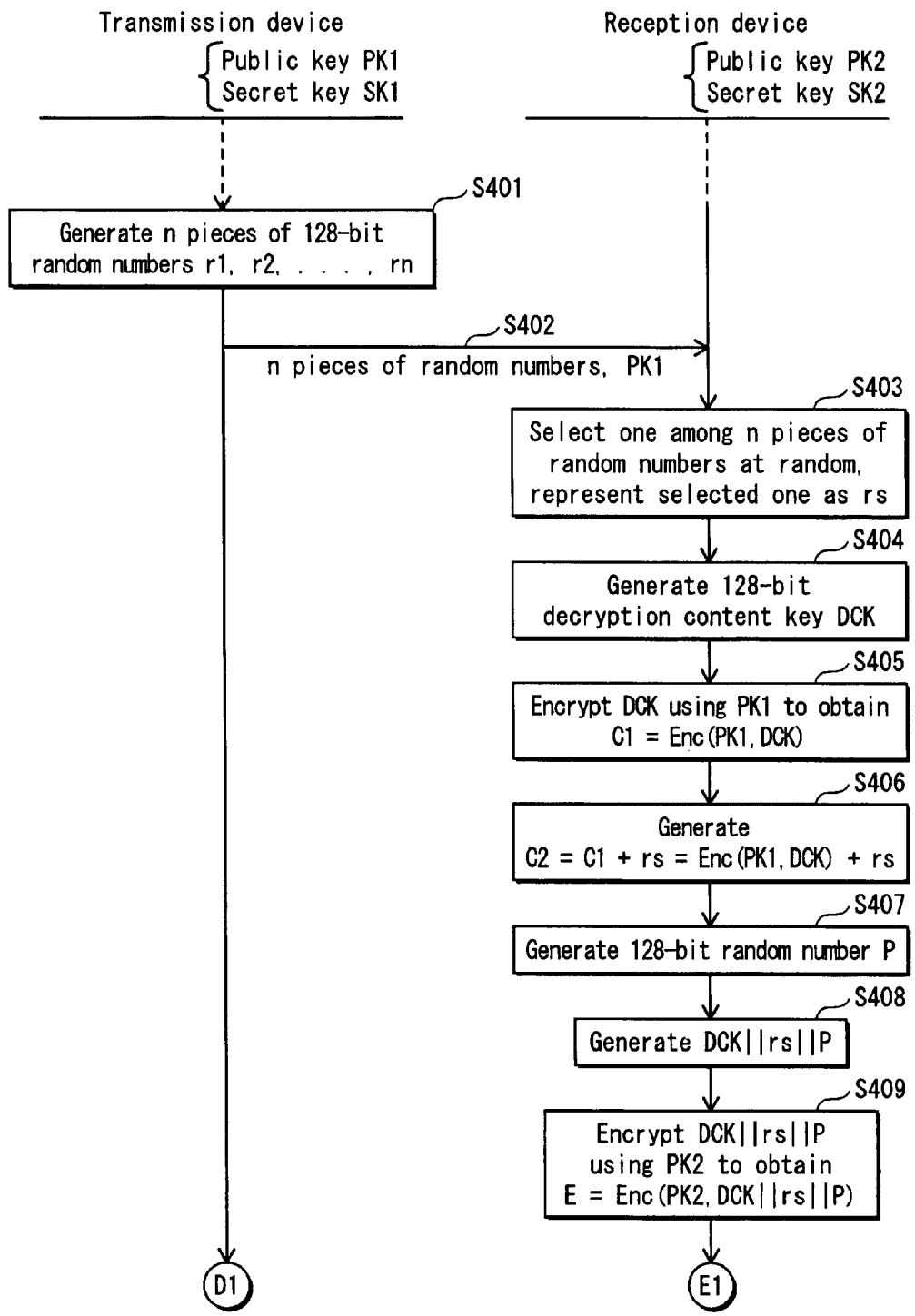
FIG. 25 is a flowchart showing part of the operation of the content transmission/reception process in Embodiment 2, continued to FIG. 26.
Figure 26:
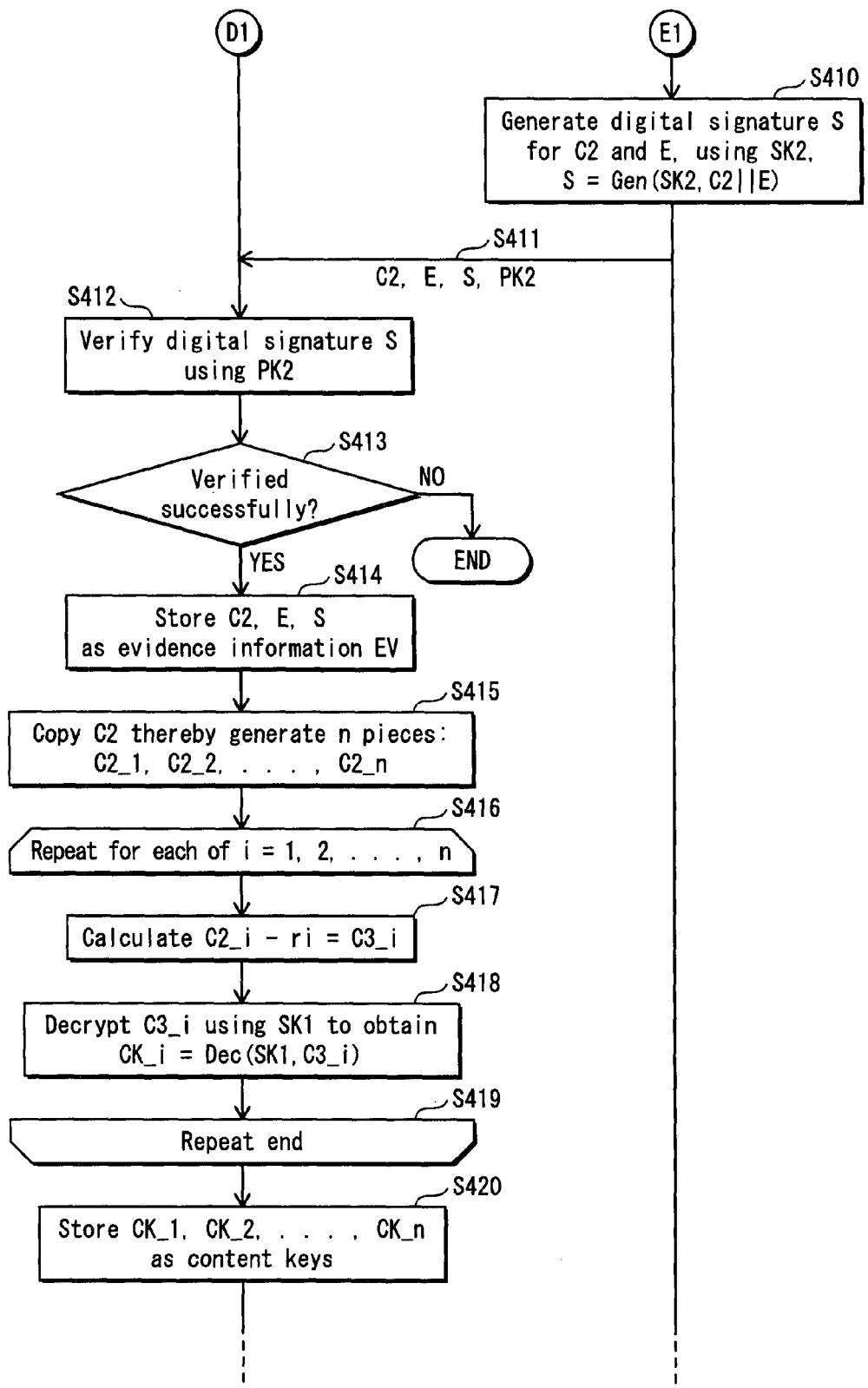
FIG. 26 is a flowchart showing part of the operation of the content transmission/reception process in Embodiment 2.

FIGS. 23 and 24 are flowcharts showing the operation of the unauthentic content source identification process, which is a detail of step S102 shown in FIG. 19.

The content data input unit 305 reads content data from the recording medium 40 (step S301), and stores the read content data into the tracking content data holding unit 306, as the tracking content data TCNT (step S302). The content data input unit 305 then outputs a watermark information extraction request to the watermark information extracting unit 301.

The watermark information extracting unit 301, upon receiving the watermark information extraction request from the content data input unit 305, obtains tracking content data TCNT from the tracking content data holding unit 306.

The watermark information extracting unit 301 extracts an electronic watermark that has been embedded in the obtained tracking content data TCNT, and further obtains the transfer source device identifier ID_1, transfer destination device identifier ID_2, evidence information EV, and content key hash HCK (step S303). The watermark information extracting unit 301 outputs the transfer source device identifier ID_1, transfer destination device identifier ID_2, evidence information EV, and content key hash HCK to the evidence verifying unit 302.

The evidence verifying unit 302, upon receiving the transfer source device identifier ID_1, transfer destination device identifier ID_2, evidence information EV, and content key hash HCK from the watermark information extracting unit 301, outputs the transfer destination device identifier ID_2, evidence information EV, and RSA decryption process request RSAD to the encryption processing unit 307.

Upon receiving the RSA decryption process request RSAD, the encryption processing unit 307 obtains, from the encryption key holding unit 308, key information SK_2 (n2, d2) that corresponds to the transfer destination device identifier ID_2 (step S304), and decrypts the evidence information EV (step S305). The evidence verifying unit 302 then receives decrypted evidence information DEV, which is a result of decrypting the evidence information EV, from the encryption processing unit 307 (step S306).

Following this, the evidence verifying unit 302 outputs the hash value calculation request HASH and decrypted evidence information DEV to the encryption processing unit 307.

Upon receiving the hash value calculation request HASH, the encryption processing unit 307 obtains, by performing a calculation, the decrypted evidence information hash HDEV which is a hash value corresponding to the decrypted evidence information DEV (step S307), and outputs the calculated decrypted evidence information hash HDEV to the evidence verifying unit 302.

The evidence verifying unit 302 compares the value of the decrypted evidence information hash HDEV with the value of the content key hash HCK to judge whether they are equal (step S308).

If the value of the decrypted evidence information hash HDEV is not equal to the value of the content key hash HCK (NO in step S308), the evidence verifying unit 302 sets the evidence authenticity flag FLAG to "0" (step S309).

If the value of the decrypted evidence information hash HDEV is equal to the value of the content key hash HCK (YES in step S308), the evidence verifying unit 302 sets the evidence authenticity flag FLAG to "1" (step S310).

After this, the evidence verifying unit 302 outputs the transfer source device identifier ID_1, transfer destination device identifier ID_2, and evidence authenticity flag FLAG to the source judging unit 303.

The source judging unit 303 obtains the transfer source device identifier ID_1, transfer destination device identifier ID_2, and evidence authenticity flag FLAG from the evidence verifying unit 302 (step S311).

The source judging unit 303 checks what value the evidence authenticity flag has been set to (step S312).

If the received evidence authenticity flag has been set to "0" ("0" in step S312), the source judging unit 303 outputs the transfer source device identifier ID_1 to the source output unit 304, as the unauthentic content source device identifier (step S313).

If the received evidence authenticity flag has been set to "1" ("1" in step S312), the source judging unit 303 outputs the transfer destination device identifier ID_2 to the source output unit 304, as the unauthentic content source device identifier (step S314).

Upon receiving the unauthentic content source device identifier from the source judging unit 303, the source output unit 304 displays the received unauthentic content source device identifier onto the display (step S315).

Effects of Embodiment 1

Here will be described the advantageous effects of Embodiment 1.

(a) First, in Embodiment 1, the reception device 20 can select and obtain one among a plurality of content keys generated by the transmission device 10, in such a manner that the transmission device 10 does not recognize which, among the plurality of content keys, has been obtained by the reception device 20. This will be described in the following.

The transmission device 10 encrypts n content keys CK_1, CK_2, ..., CK_n by the RSA algorithm using the encryption key e1 of the transmission device 10. This generates n encrypted first content keys CK_1^e1 (mod n1), CK_2^e1 (mod n1), ..., CK_n^e1 (mod n1). The generated n first encrypted content keys are sent to the reception device 20.

The reception device 20 selects a CK_s^e1 (mod n1) from among the n encrypted first content keys, where s=any of 1, 2, ..., n. The reception device 20 then encrypts the selected CK_s^e1 (mod n1) by the RSA algorithm using the encryption key e2 of the reception device 20. This generates the second encrypted content key CK_s^(e1×e2) (mod n2). The reception device 20 transmits the generated second encrypted content key CK_s^(e1×e2)(mod n2) to the transmission device 10.

Since the transmission device 10 does not hold the public key of the reception device 20, the transmission device 10 cannot decrypt the received second encrypted content key. The transmission device 10 thus cannot determine which first encrypted content key the reception device 20 selected. For this reason, the transmission device 10 cannot identify the content data that the reception device 20 has obtained.

Further, the transmission device 10 decrypts the second encrypted content key CK_s^(e1×e2) (mod n2) using the decryption key d1 of the transmission device 10. This generates the third encrypted content key CK_s^(e1×e2×d1) (mod n1).

In the above representation, "n1" is equal to a product "p1×q1" of a multiplication of two prime numbers p1 and q1, "e1" and "d1" are generated to satisfy a conditional equation e1×d1=1 (mod L), where "L" represents the least common multiple of (p1-1) and (q1-1).

Accordingly, the third encrypted content key is represented as follows.

$$CK\_s\hat{\ }(e1 \times e2 \times d1) = CK\_s\hat{\ }(1 \times e2)(\bmod n1) = CK\_s\hat{\ }e2(\bmod n1)$$

The transmission device 10 transmits the third encrypted content key CK_s^e2 (mod n1).

The reception device 20 decrypts the received third encrypted content key CK_s^e2 (mod n1) using the decryption key d2 of the reception device 20.

With this decryption, the decryption content key DCK, which is represented as CK_s^(e2×d2) (mod n2), is obtained.

Similar to the earlier comments, in the above representation, "n2" is equal to a product "p2×q2" of a multiplication of two prime numbers p2 and q2, "e2" and "d2" are generated to satisfy a conditional equation e2×d2=1 (mod L), where "L" represents the least common multiple of (p2-1) and (q2-1).

Accordingly, the decryption content key DCK is represented as follows.

$$DCK = CK\_s\hat{\ }(e2 \times d2) = CK\_s\hat{\ }1 = CK\_s(\bmod n2)$$

From the description up to now, it is apparent that the reception device 20 can obtain the content key CK_s generated by the transmission device 10, in such a manner that the transmission device 10 does not recognize which content key has been obtained by the reception device 20.

(b) Next, in Embodiment 1, it is possible to identify a device that is the source of a pirated content, from the pirated content. This will be described in the following.

It is presumed first that the transmission device 10, which is a transfer source of a content, is an unauthentic terminal. Here, the transmission device 10 can "blame a crime upon" the reception device 20 if the transmission device 10 can identify a piece of electronic-watermark-embedded content data received by the reception device 20 and can distribute outside copies of the identified content data as pirated contents.

However, as described above, the transmission device 10 cannot recognize which content key the reception device 20 has selected and which electronic-watermark-embedded content data the reception device 20 has obtained. With this structure, it is impossible for the transmission device 10 to identify the electronic-watermark-embedded content data received by the reception device 20.

Further, according to Embodiment 1, it is possible to judge whether or not a piece of content is one that is to be received by the reception device 20, by extracting the electronic watermark from the piece of content data.

From these, even if the transmission device 10 selects one among a plurality of copies of content data in which different electronic watermarks have been embedded respectively, and distributes outside the selected copy of content data, it is highly possible that the distributed copy of content data is judged not to have been received by the reception device 20 and thus judged to be unauthentic.

It is presumed next that the reception device 20, which is a transfer destination of a content, is an unauthentic terminal. According to Embodiment 1, the reception device 20 can only obtain content data in which an evidence, which indicates that the content data has been received by the reception device 20 itself, is embedded as an electronic watermark.

With this structure, even if the reception device 20 distributes outside a copy of the electronic-watermark-embedded content data that the reception device 20 itself obtained, as a pirated content, the copy of the content data is judged to have been received by the reception device 20 and judged to be unauthentic.

(c) As apparent from the above description, in Embodiment 1, it is possible to identify a device that is the source of a pirated content, regardless of whether the unauthentic device is the transmission device 10, which is a transfer source of the content, or the reception device 20 which is a transfer destination of the content.

Embodiment 2

Embodiment 2 of the present invention will be described in the following.

<Overview>

In Embodiment 1, the RSA encryption is used in the content transmission/reception process that can identify the source of an unauthentic content. In Embodiment 2, not limited to the RSA encryption, any other public key encryption algorithm, such as the ElGamal encryption or the elliptic curve cryptosystem, can be used in the content transmission/reception process to identify the source of an unauthentic content.

<Structure>

Embodiment 2 has the same system structure as the content distribution system 1 shown in FIG. 1. That is to say, the system of Embodiment 2 is composed of a broadcast station device, a transmission device, a reception device, an unauthentic content source identifying device, and a recording medium. These devices have the same internal structures as the transmission device 10, the reception device 20, and the unauthentic content source identifying device 30 in Embodiment 1.

In Embodiment 2, it is presumed that the transmission device holds the public key PK1 and the secret key SK1 for any public key encryption algorithm, that the reception device holds the public key PK2 and the secret key SK2 for the same public key encryption algorithm as the transmission device, and that the unauthentic content source identifying device holds the public key PK1 and the secret key SK1 of the transmission device and the public key PK2 and the secret key SK2 of the reception device.

<Operation>

Here, the operation of Embodiment 2 will be described with reference to FIGS. 25 through 28.

1. Overall System Operation

The overall operation of Embodiment 2 is the same as the operation of Embodiment 1 shown in FIG. 19, and description thereof is omitted.

2. Operation of Content Transmission/Reception Process

The operation of the content transmission/reception process in Embodiment 2 is partially the same as Embodiment 1. More specifically, Embodiment 2 operates the same as Embodiment 1 in steps S201 through S206 and steps S241 through S253.

Embodiment 2 differs from Embodiment 1 in the content key transmission/reception process performed by the transmission device and the reception device. Now, the difference will be described with reference to the flowcharts shown in FIGS. 25 and 26.

First, the transmission device generates n 128-bit random numbers r1, r2, . . . , rn (step S401).

The transmission device transmits the generated n 128-bit random numbers r1, r2, . . . , rn and the public key PK1 of the transmission device to the reception device, and the reception device receives the n 128-bit random numbers r1, r2, . . . , rn and the public key PK1 of the transmission device (step S402).

The reception device selects one among the n random numbers at random (step S403). Here, the selected random number is represented by "rs" (s=any of 1, 2, . . . , n).

Next, the reception device generates a 128-bit decryption content key DCK (step S404), and encrypts the generated decryption content key DCK using the public key PK1 of the transmission device (step S405). Here, the encrypted text of the decryption content key DCK is denoted as C1=Enc (PK1, DCK), where Enc(K,M) denotes an encrypted text obtained by encrypting a plain text M using an encryption key K.

Following this, the reception device generates C2=Enc (PK1,DCK)+rs by adding the random number rs selected in step S403 to C1 (step S406).

Next, the reception device generates a 128-bit random number P (step S407), and concatenates the decryption content key DCK, random number rs, and random number P (step S408). Here, the value generated as a result of the concatenation is denoted as DCK∥rs∥P.

The reception device then generates E=Enc (PK2, DCK∥rs∥P) by encrypting DCK∥rs∥P using the public key PK2 of the own device as an encryption key (step S409).

After this, the reception device generates a digital signature S=Gen(SK2,C2∥E) for a value C2∥E being a concatenated value of the encrypted texts C2 and E, using the secret key SK2 of the own device (step S410). Here, Gen(K,M) represents a digital signature generated for a message M using a signature generation key K. The technology for making the digital signature is well known, and description thereof is omitted.

The reception device transmits the C2, E, S, and public key PK2 to the transmission device, and the transmission device receives the C2, E, S, and public key PK2 (step S411).

The transmission device verifies whether or not the digital signature S is an authentic signature for C2∥E, using the public key PK2 as the signature verification key (step S412).

If it is judged that the digital signature S is not an authentic digital signature issued by the reception device (NO in step S413), the transmission device ends the process of transferring the content to the reception device.

If it is judged that the digital signature S is an authentic digital signature issued by the reception device (YES in step S413), the transmission device stores the values C2 and E and digital signature S, as the evidence information EV, into the evidence holding unit (step S414). That is to say, Embodiment 2 differs from Embodiment 1 in the value of the evidence information EV.

Next, the transmission device copies the value C2 and thereby generates n values: C2_1, C2_2, . . . , C2_n (step S415).

The transmission device then repeats steps S416 through S419 for each of i=1, 2, . . . , n.

First, the transmission device generates C3_i=C2_i−ri by subtracting the value of random number ri generated in step S401 from C2_i (step S417). The transmission device then generates CK_i=Dec(SK1,C3_i) by decrypting C3_i using the secret key SK1 of the own device as the decryption key (step S418). Here, Dec(K,C) represents a decrypted text that is obtained by decrypting an encrypted text C using a decryption key K.

The transmission device stores the n values CK_1, CK_2, . . . , CK_n, as content keys, into the content key holding unit (step S420).

With this, the content key transmission/reception process performed by the transmission device and the reception device in Embodiment 2 ends, and the process continues as the control moves to step S241 in Embodiment 1.

3. Operation of Unauthentic Content Source Identification Process

The operation of the unauthentic content source identification process in Embodiment 2 is partially the same as Embodiment 1. More specifically, Embodiment 2 operates the same as Embodiment 1 in steps S301 through S302 and steps S311 through S315.

Now, the difference from Embodiment 1 will be described with reference to the flowcharts shown in FIGS. 27 and 28.

First, the evidence verifying unit, upon receiving the transfer source device identifier ID_1, transfer destination device identifier ID_2, evidence information EV, and content key hash HCK from the watermark information extracting unit, obtains the values C2 and E and digital signature S from the evidence information EV (step S501).

Next, the evidence verifying unit obtains the public key PK2 that corresponds to the transfer destination device identifier ID_2, from the encryption key holding unit (step S502). The evidence verifying unit verifies whether or not the digital signature S is an authentic signature for the value C∥E, using PK2 (step S503).

If it is judged that the digital signature S is not an authentic digital signature (NO in step S504), the evidence verifying unit sets the evidence authenticity flag FLAG to "0" (step S505), and outputs the transfer source device identifier ID_1, transfer destination device identifier ID_2, and evidence authenticity flag FLAG to the source judging unit.

If it is judged that the digital signature S is an authentic digital signature (YES in step S504), the evidence verifying unit outputs the transfer destination device identifier ID_2, the value E, which is contained in the evidence information EV, and the decryption process request to the encryption processing unit so as to decrypt the value E.

The encryption processing unit obtains DCK||rs||P by decrypting the value E using the secret key K of the reception device (step S506).

Next, the encryption processing unit encrypts DCK using the public key PK1 of the transmission device to obtain an encrypted value, and generates Enc(PK1,DCK)+rs by adding rs to the obtained encrypted value (step S507). The encryption processing unit outputs the generated Enc(PK1,DCK)+rs to the evidence verifying unit.

Upon receiving Enc(PK1,DCK)+rs from the encryption processing unit, the evidence verifying unit judges whether or not the received Enc(PK1,DCK)+rs matches the value C2.

If it is judged that Enc(PK1,DCK)+rs does not match the value C2 (NO in step S508), the evidence verifying unit sets the evidence authenticity flag FLAG to "1" (step S509), and outputs the transfer source device identifier ID_1, transfer destination device identifier ID_2, and evidence authenticity flag FLAG to the source judging unit.

On the other hand, if it is judged that Enc(PK1,DCK)+rs matches the value C2 (YES in step S508), the evidence verifying unit outputs the hash value calculation request HASH and DCK to the encryption processing unit so that the hash value for DCK is calculated.

The encryption processing unit calculates evidence information hash value HK, which is a hash value for DCK (step S510), and outputs the calculated evidence information hash value HK to the evidence verifying unit.

The evidence verifying unit then compares the evidence information hash value HK with the content key hash HCK to see whether they are equal.

If the evidence information hash value HK is different from the content key hash HCK (NO in step S511), the evidence verifying unit sets the evidence authenticity flag FLAG to "0" (step S512), and outputs the transfer source device identifier ID_1, transfer destination device identifier ID_2, and evidence authenticity flag FLAG to the source judging unit.

If the evidence information hash value HK is equal to the content key hash HCK (YES in step S511), the evidence verifying unit sets the evidence authenticity flag FLAG to "1", and outputs the transfer source device identifier ID_1, transfer destination device identifier ID_2, and evidence authenticity flag FLAG to the source judging unit.

The process then continues as the control moves to step S311 in Embodiment 1.

Effects of Embodiment 2

Here will be described the advantageous effects of Embodiment 2.
(a) In Embodiment 2, the transmission device cannot identify a content obtained by the reception device. This will be described in the following.

First, the transmission device transmits n random numbers r1, r2, ..., rn and the public key PK1 of the own device to the reception device.

The reception device generates decryption content key DCK by itself. The reception device then encrypts the generated decryption content key DCK using the public key PK1 of the transmission device, where the encrypted text of the decryption content key DCK is denoted as C1=Enc(PK1, DCK). The reception device selects one among the n random numbers r1, r2, ..., rn, where the selected random number is denoted as "rs" (s=any of 1, 2, ..., n), and generates C2=C1+rs by adding the value of the selected random number rs to C1.

The reception device then transmits the value C2 and public key PK2 of the reception device to the transmission device. Here, the value E and digital signature S are disregarded.

The transmission device receives the value C2 and public key PK2 of the reception device from the reception device, but cannot determine, from the received value C2, which random number the reception device selected since the transmission device does not have value of the decryption content key DCK.

Accordingly, the transmission device performs a calculation of subtracting each of random numbers r1, r2, ..., rn from the value C2 so that one content can be used regardless of which random number the reception device selected. The results are represented as C3_1=C2_1−r1, C3_2=C2_2−r2, ..., C3_n=C2_n−rn. One of these matches the value of random number rs that the reception device selected.

After this, the transmission device generates CK_1=Dec(SK1,C3_1), CK_2=Dec(SK1,C3_2), ..., CK_n=Dec(SK1,C3_n) by decrypting the values C3_1, C3_2, ..., C3_n using the secret key SK1 of the own device.

Here, one of CK_1, CK_2, ..., CK_n matches the value of decryption content key DCK generated by the reception device, but the transmission device cannot determine the one that matches the value of decryption content key DCK.

The transmission device also generates n pieces of encrypted content data by embedding respectively different watermarks thereinto, using content keys CK_1, CK_2, ..., CK_n.

Upon receiving the n pieces of encrypted content data from the transmission device, the reception device obtains one piece of content data by decrypting one of the n pieces of encrypted content data using the decryption content key DCK, not known to the transmission device.
(b) In Embodiment 2, it is possible to identify a device that is the source of a pirated content, from the pirated content. This will be described in the following.

The method of Embodiment 2 is basically the same as that of Embodiment 1 except that, in Embodiment 2, the evidence information EV contains digital signature S of the reception device.

This arrangement of containing the digital signature S into the evidence information EV is made to prevent the reception device from performing an unauthorized act of counterfeiting the values C2 and E.

More specifically, suppose that the reception device generated the values C2 and E by encrypting a false value that is not the decryption content key DCK, using PK2. If the reception device further generates a pirated content based on this unauthorized act, the unauthentic content source identifying device would erroneously judge that the source of the pirated content is the transmission device.

Assuming that the reception device may conduct such an unauthorized act, in Embodiment 2, the digital signature S is added to C2||E. This enables the unauthentic content source identifying device to properly determine the source of the pirated content.
(c) As apparent from the above description, in Embodiment 2, as is the case with Embodiment 1, it is possible to identify a device that is the source of a pirated content, regardless of whether the unauthentic device is the transmission device, which is a transfer source of the content, or the reception device which is a transfer destination of the content.

Embodiment 3

Embodiment 3 of the present invention will be described in the following.

<Overview>

In Embodiment 1, the RSA encryption is used in the content transmission/reception process that can identify the source of an unauthentic content.

In Embodiment 2, not limited to the RSA encryption, any other public key encryption algorithm, such as the ElGamal encryption or the elliptic curve cryptosystem, can be used in a system that is similar to the system of Embodiment 1. Here, in contrast to Embodiment 2 where the transmission device generates random numbers, in Embodiment 3, the transmission device does not need to generate random numbers.

<Structure>

Embodiment 3 has the same system structure as the content distribution system 1 shown in FIG. 1. That is to say, the system of Embodiment 3 is composed of a broadcast station device, a transmission device, a reception device, an unauthentic content source identifying device, and a recording medium. These devices have the same internal structures as the transmission device 10, the reception device 20, and the unauthentic content source identifying device 30 in Embodiment 1.

In Embodiment 3, it is presumed that the transmission device holds n public keys $PK1\_1, PK1\_2, \ldots, PK1\_n$ and, in correspondence, n secret keys $SK1\_1, SK1\_2, \ldots, SK1\_n$, respectively in correspondence with index information ID_s. It is also presumed that the reception device holds the public key PK2 and the secret key SK2. It should be noted here that the public key encryption algorithm used by the transmission device and the reception device may be any algorithm such as the RSA encryption, the ElGamal encryption, or the elliptic curve cryptosystem.

<Operation>

The overall operation of Embodiment 3 is the same as the operation of Embodiment 1 shown in FIG. 19, and description thereof is omitted.

Figure 27:
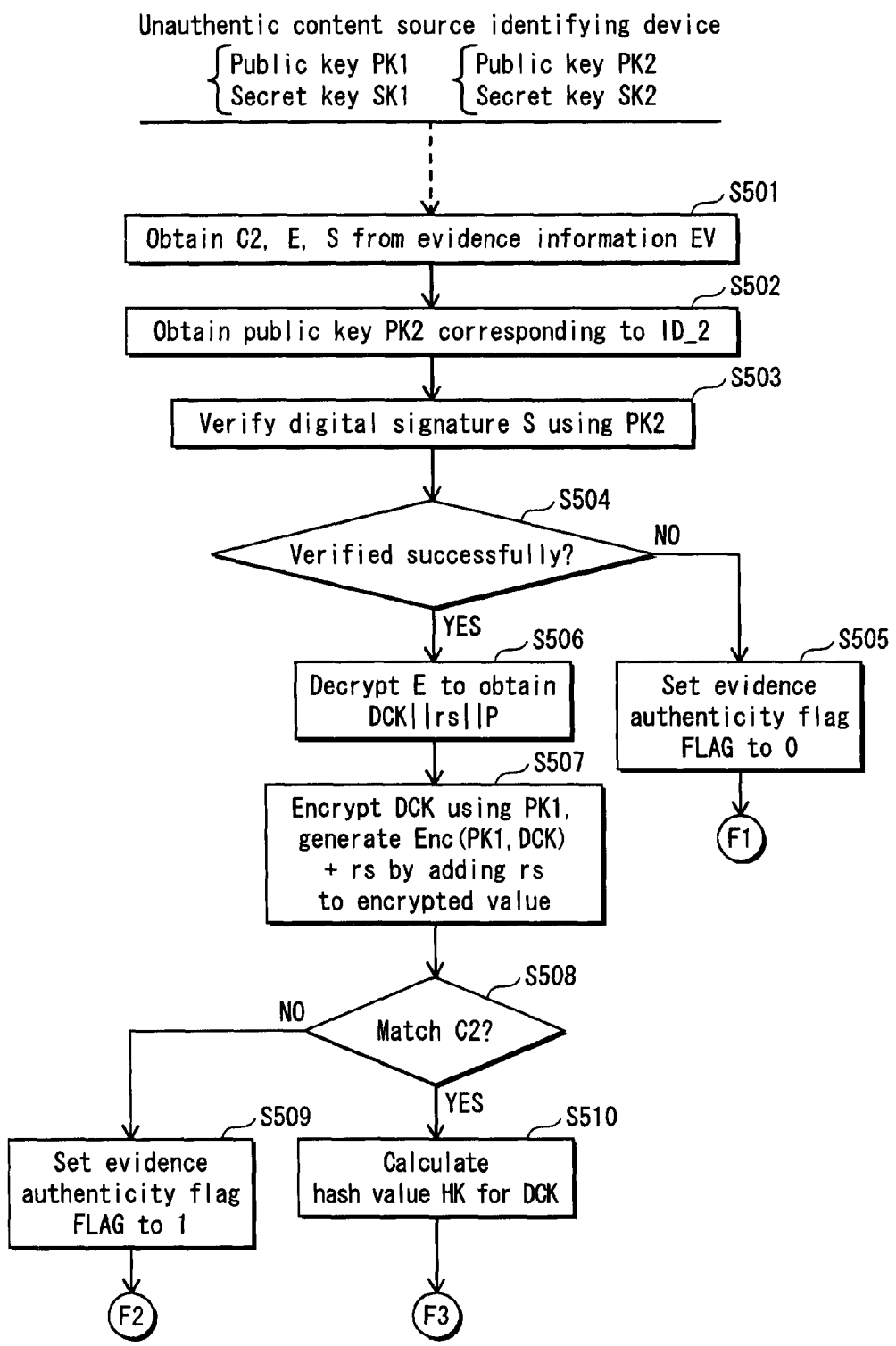
FIG. 27 is a flowchart showing part of the operation of the unauthentic content source identification process in Embodiment 2, continued to FIG. 28.
Figure 28:
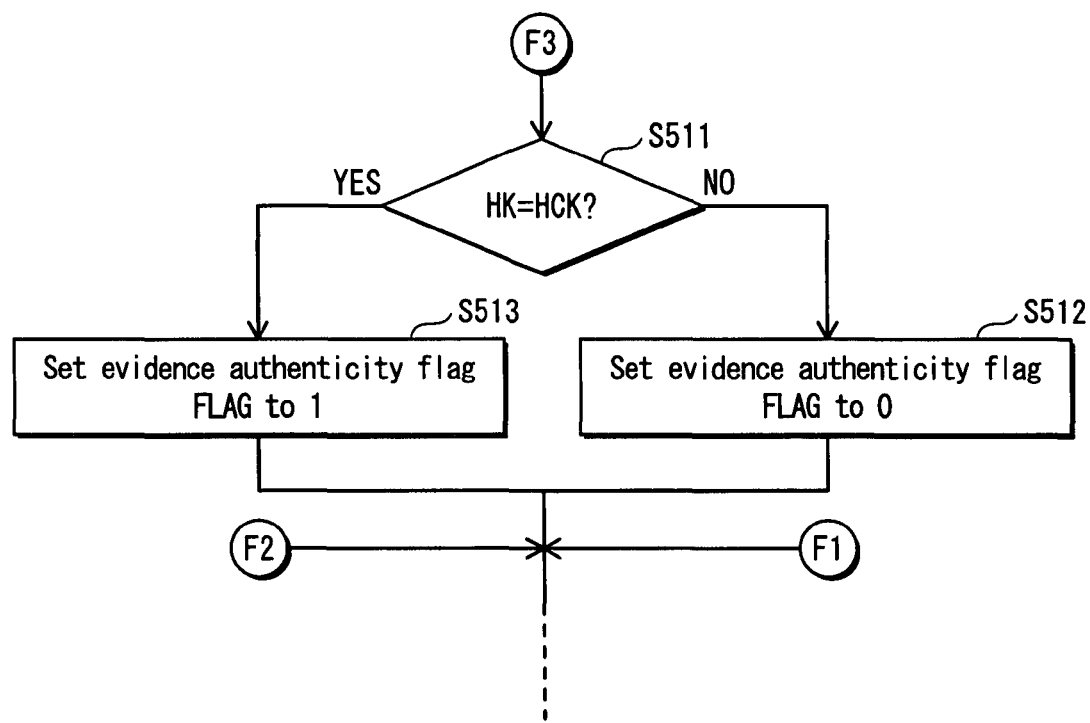
FIG. 28 is a flowchart showing part of the operation of the unauthentic content source identification process in Embodiment 2.

Also, the operation of the unauthentic content source identification process in Embodiment 3 is the same as the operation of Embodiment 2 shown in FIGS. 27 and 28, and description thereof is omitted.

The operation of the content transmission/reception process in Embodiment 3 is partially the same as Embodiment 1. More specifically, Embodiment 3 operates the same as Embodiment 1 in steps S201 through S206 and steps S241 through S253.

Figure 29:
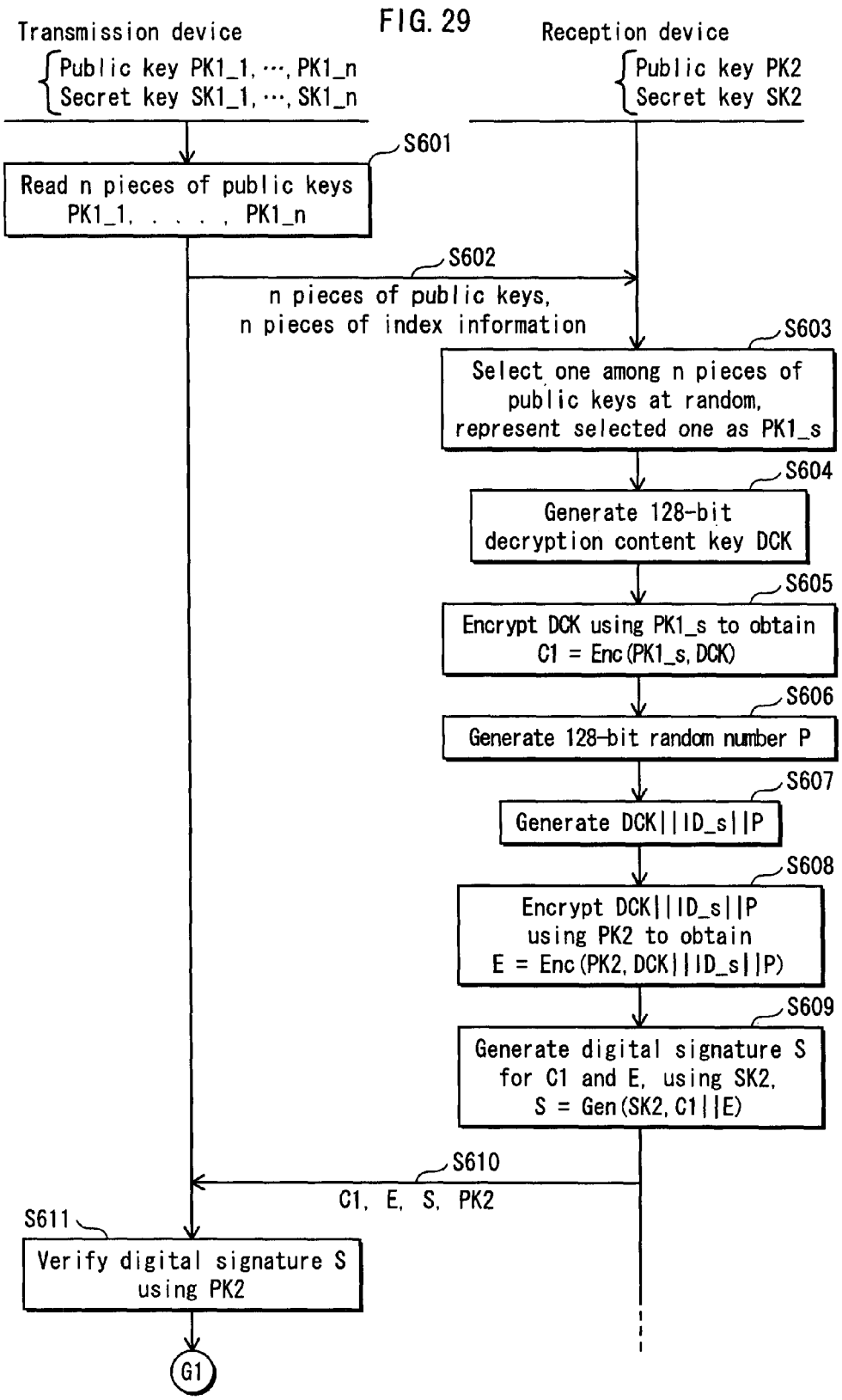
FIG. 29 is a flowchart showing part of the operation of the content transmission/reception process in Embodiment 3, continued to FIG. 30.
Figure 30:
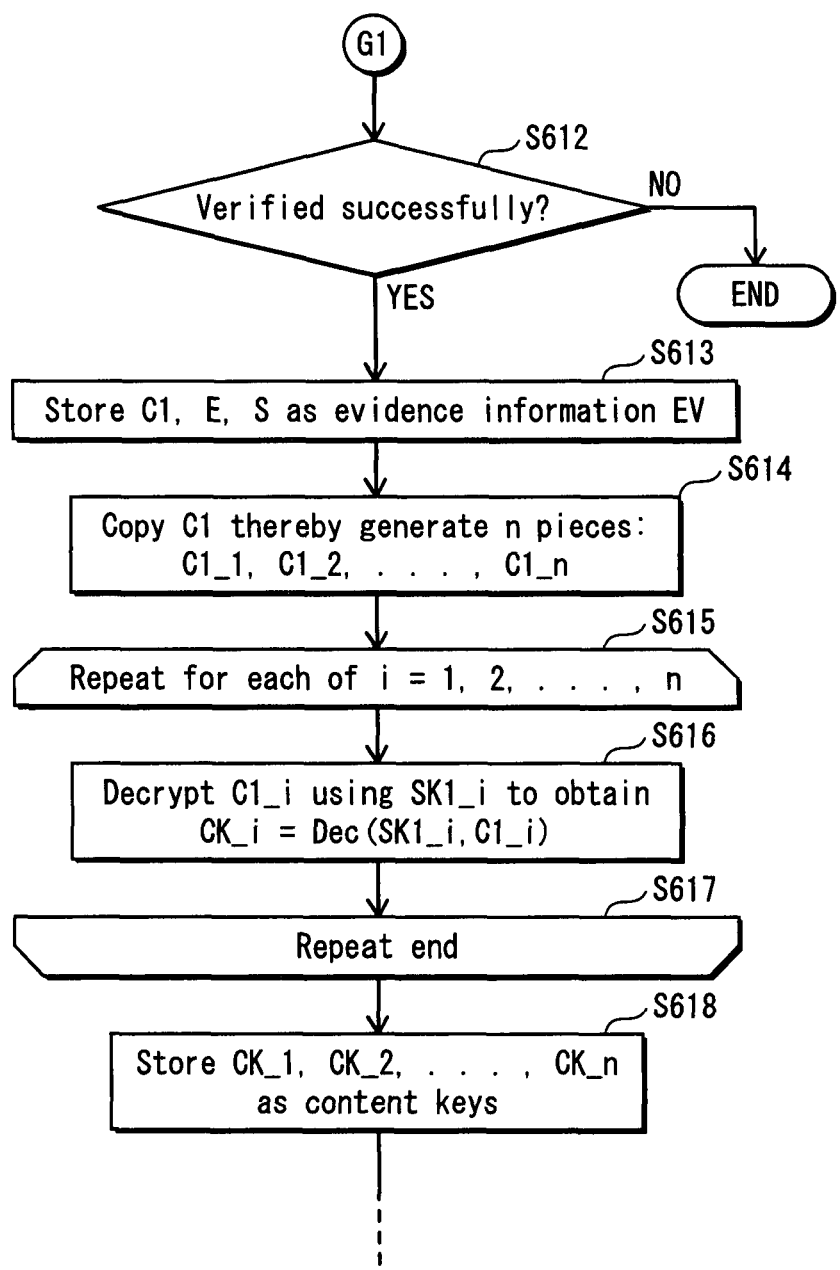
FIG. 30 is a flowchart showing part of the operation of the content transmission/reception process in Embodiment 3.

Embodiment 3 differs from Embodiment 1 in the content key transmission/reception process performed by the transmission device and the reception device. Now, the difference will be described with reference to the flowcharts shown in FIGS. 29 and 30.

The transmission device reads the n public keys $PK1\_1, PK1\_2, \ldots, PK1\_n$ that the transmission device holds (step S601), and transmits the read n public keys to the reception device. The reception device receives the n public keys (step S602).

The reception device selects one among the n public keys at random, where the selected public key is denoted as PK1_s (s=any of 1, 2, . . . , n) (step S603).

The reception device then generates a 128-bit decryption content key DCK (step S604). The reception device generates C1=Enc(PK1_s,DCK) by encrypting the decryption content key DCK using the public key PK1_s of the transmission device selected in step S603 (step S605).

Next, the reception device generates a 128-bit random number P (step S606), and then generates DCK∥ID_s∥P by concatenating the decryption content key DCK, the index information ID_s of the public key selected in step S603, and the random number P (step S607).

The reception device then generates the digital signature S=Enc(PK2,DCK∥ID_s∥P) by encrypting DCK∥ID_s∥P using the public key PK2 of the own device (step S608).

Next, the reception device then generates the digital signature S=Gen(SK2,C1∥E) for values C1 and E, using the secret key SK2 of the own device (step S609).

The reception device transmits the value C1, value E, digital signature S, and public key PK2 to the transmission device, and the transmission device receives the value C1, value E, digital signature S, and public key PK2 (step S610).

The transmission device verifies whether or not the digital signature S is an authentic signature for C1∥E, using the public key PK2 of the reception device as the signature verification key (step S611).

If it is judged that the digital signature S is not an authentic digital signature issued by the reception device (NO in step S612), the transmission device ends the process of transferring the content to the reception device.

If it is judged that the digital signature S is an authentic digital signature issued by the reception device (YES in step S612), the transmission device stores the values C1 and E and digital signature S, as the evidence information EV, into the evidence holding unit (step S613). That is to say, Embodiment 3 differs from Embodiment 1 in the value of the evidence information EV.

Next, the transmission device copies the value C1 and thereby generates n values: $C1\_1, C1\_2, \ldots, C1\_n$ (step S614). The transmission device then repeats steps S615 through S617 for each of i=1, 2, . . . , n.

First, the transmission device generates CK_i=Dec(SK1_i, C1_i) by decrypting C1_i using the secret key SK1_i of the own device (step S616).

The transmission device stores the generated n values $CK\_1, CK\_2, \ldots, CK\_n$ as content keys into the content key holding unit (step S618).

With this, the content key transmission/reception process performed by the transmission device and the reception device in Embodiment 3 ends, and the process continues as the control moves to step S241 in Embodiment 1.

Effects of Embodiment 3

Here will be described the advantageous effects of Embodiment 3.

(a) In Embodiment 3, the transmission device cannot identify a content obtained by the reception device. This will be described in the following.

The transmission device transmits the n public keys $PK1\_1, PK1\_2, \ldots, PK1\_n$ to the reception device. The reception device generates a decryption content key DCK by itself. The reception device generates an encrypted value C1=Enc(PK1_s,DCK) by encrypting the decryption content key DCK using the public key PK1_s (s=any of 1, 2, . . . , n), which is one of the n public keys of the transmission device. The reception device transmits the value C1 and the public key PK2 of the reception device to the transmission device. Here, the reception device transmits the value E and digital signature S, as well as the value C1 and the public key PK2, but the value E and digital signature S are disregarded here.

The transmission device receives the value C1 and public key PK2 from the reception device, but cannot determine, from the received value C1, which public key the reception device selected from the n pieces of public keys since the transmission device does not have value of the decryption content key DCK generated by the reception device.

Accordingly, the transmission device generates CK_1=Dec(SK1_1,C1), CK_2=Dec(SK1_2,C1), ..., CK_n=Dec(SK1_n,C1) by decrypting the value C1 using all secret keys SK1_1, SK1_2, ..., SK1_n so that one content can be used regardless of which public key the reception device selected from among the n pieces of public keys PK1_1, PK1_2, ..., PK1_n.

One of CK1_1, CK1_2, ..., CK1_n generated by the transmission device matches the value of decryption content key DCK generated by the reception device.

The transmission device also generates n pieces of encrypted content data by embedding respectively different watermarks thereinto, using content keys CK_1, CK_2, ..., CK_n.

Upon receiving the n pieces of encrypted content data from the transmission device, the reception device obtains one piece of content data by decrypting one of the n pieces of encrypted content data using the decryption content key DCK, not known to the transmission device.

(b) In Embodiment 3, the evidence information EV contains the digital signature S of the reception device, as is the case with Embodiment 2. It is therefore possible in Embodiment 3 to properly identify a device that is the source of a pirated content, from the pirated content, as explained in the Effects of Embodiment 2.

(c) As apparent from the above description, in Embodiment 3, as is the case with Embodiments 1 and 2, it is possible to identify a device that is the source of a pirated content, regardless of whether the unauthentic device is the transmission device, which is a transfer source of the content, or the reception device which is a transfer destination of the content.

Embodiment 4

Embodiment 4 of the present invention will be described in the following.
<Overview>

In Embodiment 4, content keys are transmitted and received by a method that is different from any of the content transmission/reception processes performed by the transmission device and the reception device described in Embodiments 1 through 3.
<Structure>

Embodiment 4 has the same system structure as the content distribution system 1 shown in FIG. 1. That is to say, the system of Embodiment 4 is composed of a broadcast station device, a transmission device, a reception device, an unauthentic content source identifying device, and a recording medium. These devices have the same internal structures as the transmission device 10, the reception device 20, and the unauthentic content source identifying device 30 in Embodiment 1.

In Embodiment 4, it is presumed that the reception device holds the public key PK2 and the secret key SK2. It should be noted here that the public key encryption algorithm used in Embodiment 4 may be any algorithm such as the RSA encryption, the ElGamal encryption, or the elliptic curve cryptosystem.
<Operation>

The overall operation of Embodiment 4 is the same as the operation of Embodiment 1 shown in FIG. 19, and description thereof is omitted.

Also, the operation of the unauthentic content source identification process in Embodiment 3 is the same as the operation of Embodiment 2 shown in FIGS. 27 and 28, and description thereof is omitted.

The operation of the content transmission/reception process in Embodiment 4 is partially the same as Embodiment 1. More specifically, Embodiment 4 operates the same as Embodiment 1 in steps S201 through S206 and steps S241 through S253.

Figure 31:
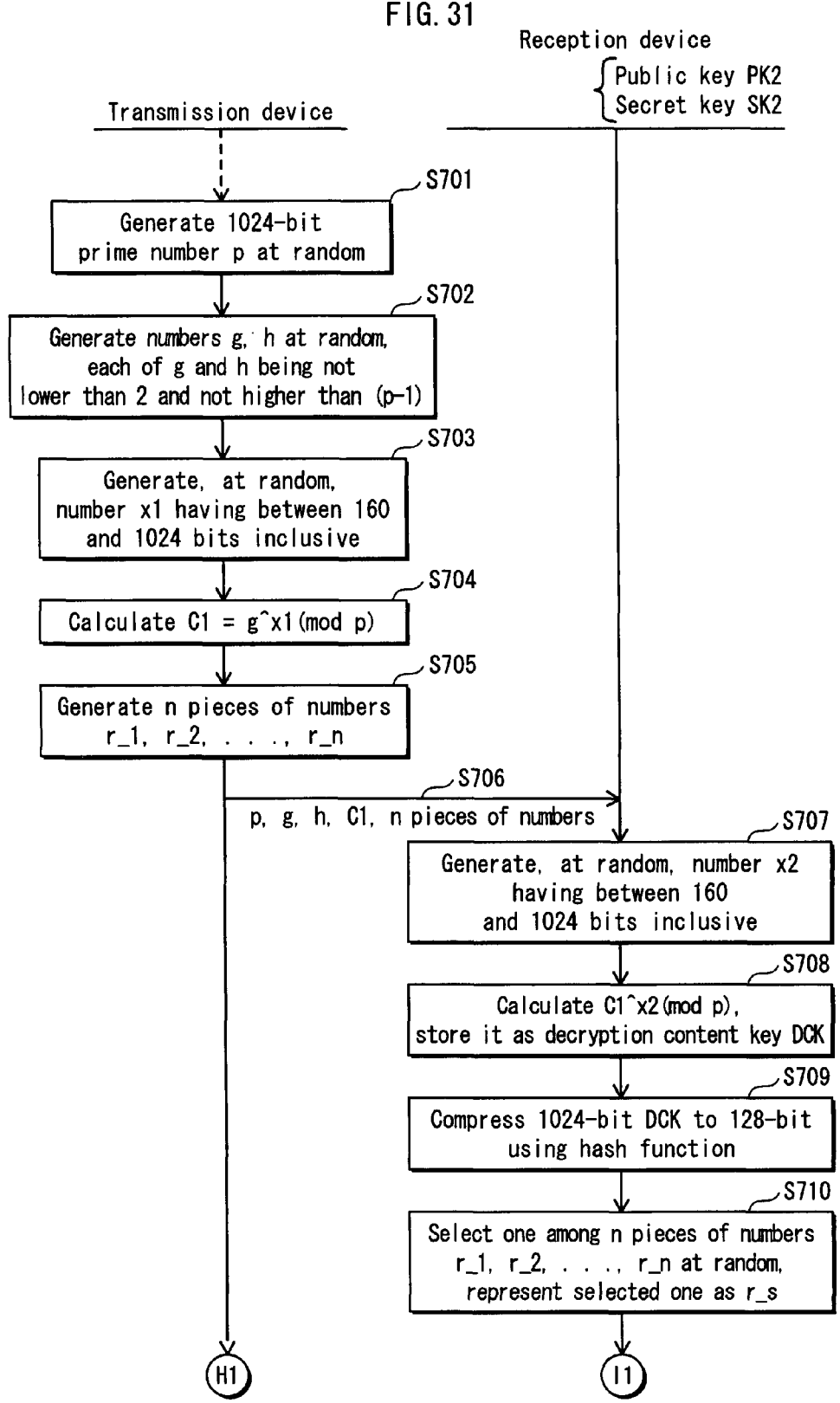
FIG. 31 is a flowchart showing part of the operation of the content transmission/reception process in Embodiment 4, continued to FIG. 32.
Figure 32:
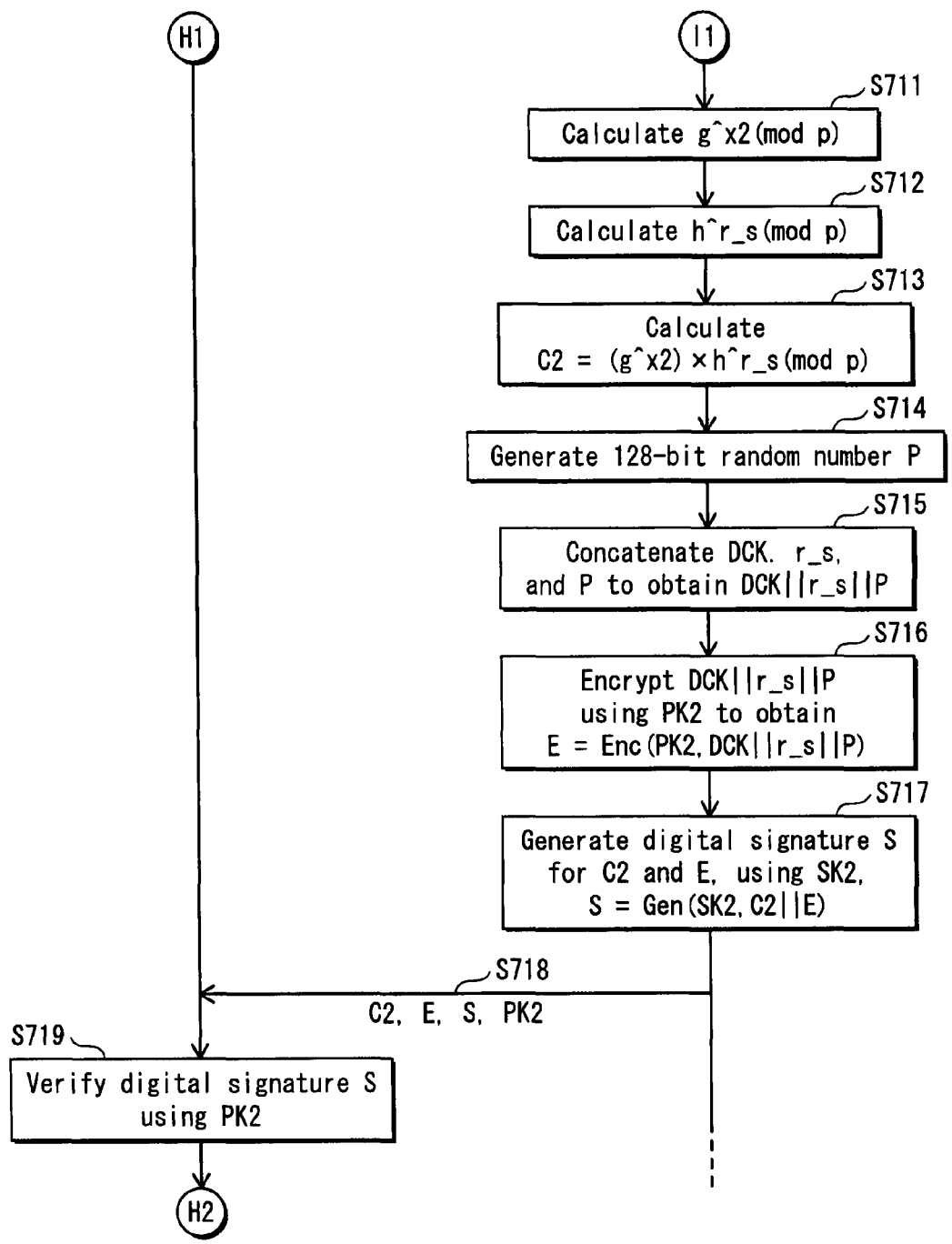
FIG. 32 is a flowchart showing part of the operation of the content transmission/reception process in Embodiment 4, continued to FIG. 33.
Figure 33:
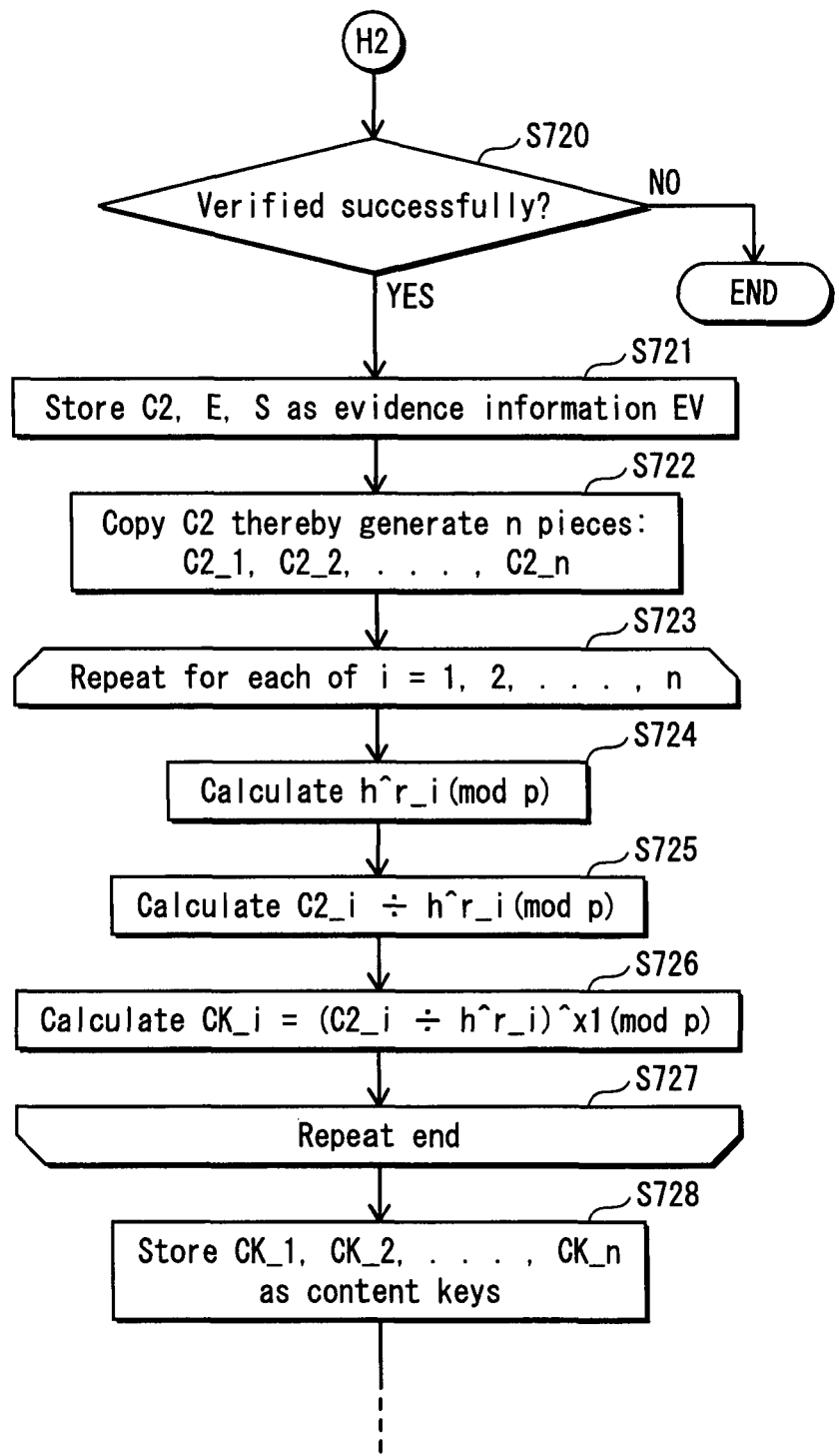
FIG. 33 is a flowchart showing part of the operation of the content transmission/reception process in Embodiment 4.

Embodiment 4 differs from Embodiment 1 in the content key transmission/reception process performed by the transmission device and the reception device. Now, the difference will be described with reference to the flowcharts shown in FIGS. 31 through 33.

The transmission device generates a 1024-bit prime number p at random (step S701). The transmission device also generates numbers g and h at random, each of g and h being not lower than 2 and not higher than (p-1) (step S702).

The transmission device then generates, at random, a number x1 having the number of bits between 160 and 1024 inclusive (step S703). The transmission device calculates $C1=g^{x1}(\bmod\ p)$ that represents $x1^{th}$ power of g with modulo p (step S704).

After this, the transmission device generates n numbers r_1, r_2, ..., r_n (step S705). The n numbers generated here may be, for example, 128-bit random numbers or numbers from 1 to n.

The transmission device transmits the values p, g, h, and C1 and n numbers r_1, r_2, ..., r_n to the reception device. The reception device receives the values p, g, h, and C1 and n numbers r_1, r_2, ..., r_n (step S706).

The reception device generates, at random, a number x2 having the number of bits between 160 and 1024 inclusive (step S707). The reception device then calculates $C1^{x2}(\bmod\ p)$ that represents $x2^{th}$ power of C1 with modulo p, and stores the calculated value as the decryption content key DCK (step S708). The calculated value has 1024 bits. The reception device compresses the 1024-bit decryption content key DCK to 128 bits using the hash function (step S709).

Following this, the reception device selects randomly one among the n numbers r_1, r_2, ..., r_n that were received in step S706, where the selected number is represented as r_s (s=any of 1, 2, ..., n) (step S710).

Next, the reception device calculates $g^{x2}(\bmod\ p)$ that represents $x2^{th}$ power of g with modulo p (step S711), and calculates $h^{r\_s}(\bmod\ p)$ that represents $r\_s^{th}$ power of g with modulo p (step S712).

The reception device then obtains a value by multiplying the two values calculated in steps S711 and S712 together, with modulo p, where the obtained value is represented as $C2=(g^{x2})\times h^{r\_s}(\bmod\ p)$ (step S713).

Next, the reception device generates a 128-bit random number P (step S714), and generates DCK||r_s||P by concatenating the decryption content key DCK, random number r_s, and random number P (step S715).

Following this, the reception device generates E=Enc(PK2,DCK||r_s||P) by encrypting DCK||r_s||P using the public key PK2 of the own device (step S716).

The reception device also generates digital signature S=Gen(SK2,C2||E) for the value C2||E using the secret key SK2 of the own device (step S717).

The reception device transmits the values C2 and E, digital signature S, and public key PK2 to the transmission device, and the transmission device receives the values C2 and E, digital signature S, and public key PK2 (step S718).

The transmission device verifies whether or not the digital signature S is an authentic signature for C2∥E, using the public key PK2 of the reception device as the signature verification key (step S719).

If it is judged that the digital signature S is not an authentic digital signature issued by the reception device (NO in step S720), the transmission device ends the process of transferring the content to the reception device.

If it is judged that the digital signature S is an authentic digital signature issued by the reception device (YES in step S720), the transmission device stores the values C2 and E and digital signature S, as the evidence information EV, into the evidence holding unit (step S721). That is to say, Embodiment 4 differs from Embodiment 1 in the value of the evidence information EV.

Next, the transmission device copies the value C2 and thereby generates n values: C2_1, C2_2, ..., C2_n (step S722), and then repeats steps S723 through S727 for each of i=1, 2, ..., n.

First, the transmission device generates $h^{r\_i} (\bmod p)$ using the value r_i generated in step S705 (step S724).

Next, the transmission device obtains $C2\_i \div h^{r\_i} (\bmod p)$ by dividing C2_i by the value $h^{r\_i} (\bmod p)$ (step S725). The transmission device then obtains $CK\_i = (C2\_i \div h^{r\_i})^{x1} (\bmod p)$ by raising the value obtained in step S724 to the $x1^{th}$ power with modulo p (step S726).

The transmission device stores the calculated n values CK_1, CK_2, ..., CK_n, as content keys, into the content key holding unit (step S728).

With this, the content key transmission/reception process performed by the transmission device and the reception device in Embodiment 4 ends, and the process continues as the control moves to step S241 in Embodiment 1.

Effects of Embodiment 4

Here will be described the advantageous effects of Embodiment 4.

(a) In Embodiment 4, the transmission device cannot identify a content obtained by the reception device. This will be described in the following.

In Embodiment 4, basically, the content key is transferred between the transmission device and the reception device based on the same principle as the DH (Diffie-Hellman) Key Agreement Method.

Here, it is unique to Embodiment 4 that the transmission device transmits the value g, value h, and n pieces of numbers r_1, r_2, ..., r_n to the reception device.

The reception device selects a number r_s from the n pieces of numbers, calculates $C2 = (g^{x2}) \times h^{r\_s} (\bmod p)$, and transmits this value to the transmission device.

On the other hand, the transmission device does not know the value x2 generated by the reception device, and thus cannot determine, from the received value C2, which number the reception device selected from the n pieces of numbers r_1, r_2, ..., r_n.

Accordingly, the transmission device divides the value C2 by $h^{r\_1}, h^{r\_2}, \ldots, h^{r\_n}$ using all of the numbers r_1, r_2, ..., r_n so that one content can be used regardless of which number the reception device selected from the n numbers r_1, r_2, ..., r_n.

As a result of this, one of $C2 \div h^{r\_1}, C2 \div h^{r\_2}, \ldots, C2 \div h^{r\_n}$ that uses the number r_s selected by the reception device should be equal to $g^{x2} (\bmod p)$.

The transmission device multiplies all of $C2 \div h^{r\_1}, C2 \div h^{r\_2}, \ldots, C2 \div h^{r\_n}$ by x1 with modulo p, and represents the obtained values as CK_1, CK_2, ..., CK_n, among which one is equal to $g^{(x1 \times x2)} (\bmod p)$.

One of the values CK_1, CK_2, ..., CK_n generated by the transmission device matches the value of decryption content key DCK generated by the reception device.

The transmission device also generates n pieces of encrypted content data by embedding respectively different watermarks thereinto, using content keys CK_1, CK_2, ..., CK_n.

Upon receiving the n pieces of encrypted content data from the transmission device, the reception device obtains one piece of content data by decrypting one of the n pieces of encrypted content data using the decryption content key DCK, in such a manner that the transmission device cannot identify the piece of content data obtained by the reception device.

(b) In Embodiment 4, the evidence information EV contains the digital signature S of the reception device, as is the case with Embodiment 2. It is therefore possible in Embodiment 4 to properly identify a device that is the source of a pirated content, from the pirated content, as explained in the Effects of Embodiment 2.

(c) As apparent from the above description, in Embodiment 4, as is the case with Embodiments 1, 2, and 3, it is possible to identify a device that is the source of a pirated content, regardless of whether the unauthentic device is the transmission device, which is a transfer source of the content, or the reception device which is a transfer destination of the content.

<<Modifications>>

The present invention, which has been described through several embodiments up to now, is not limited to the embodiments, but includes, for example, the following modifications as well.

(1) The above-described embodiments have provided four specific examples of the content transmission/reception process performed by the transmission device and the reception device. However, the content transmission/reception process performed by the transmission device and the reception device is not limited to the four examples provided in the embodiments.

The present invention requires at least such a mechanism that the transmission device and the reception device transfer content keys between them in such a manner that the reception device can obtain only one of a plurality of content keys that are transmitted from the transmission device to the reception device, and that the transmission device cannot identify the content key that the reception device obtained.

(2) In the above-described embodiments, the transmission device copies a whole content and thereby generates n pieces of contents. However, this structure is not indispensable for the present invention. The transmission device may divide a content into partial contents, and may copy one partial content and thereby generate n copies of the partial content. Then, the transmission device may embed, as an electronic watermark, the transmission destination device identifier, transmission source device identifier, evidence information, and content key hash, into each of the plurality of partial contents that have been generated by copying. Then, the transmission device may encrypt each partial content, in which a different electronic watermark has been embedded, using a different content key. Here, the remaining partial contents, which are not copied, may be encrypted using one common key, and then be transmitted. With this structure, it is possible to obtain the same advantageous effects as the above-described embodiments, with a reduced amount of data transmitted from the transmission device to the reception device.

Furthermore, to increase the number of contents that can be selected by the reception device, while reducing the amount of data transmitted from the transmission device to the reception device, the present invention may be structured such that the content key transmission/reception process of each of the above-described embodiments is repeated a plurality of times by the transmission device and the reception device. For example, in the case where (a) the number of contents that are generated by copying by the transmission device and (b) the number of content keys generated by the transmission device are n=4, the number of contents that can be selected by the reception device is 4. When, in addition to this, the content key transmission/reception process is repeated, for example, three times by the transmission device and the reception device, the number of contents that can be selected by the reception device increases to 64.

(3) In the above-described embodiments, contents are transferred between one transmission device and one reception device. However, not limited to such a peer-to-peer content transmission/reception, the present invention may be applied to a structure where contents are transferred between one server device and a plurality of client devices.

(4) The above-described embodiments provide one example of content that contains moving picture data in which video data and audio data have been multiplexed. However, the content according to the concept of the present invention includes various types of digital data.

The content for the present invention may be, for example, a moving picture, still picture, photograph, music, game, computer program, electronic map, electronic medical chart, or a document, image, text data or the like having been created by Word, PowerPoint, PDF (Portable Document Format) or the like. It should be noted here that the technology for embedding an electronic watermark into text data is well known.

Further, the content for the present invention is not limited to the content that the transmission device obtains from an external broadcast station device, but may be the content that the transmission device preliminarily holds. That is to say, the content for the present invention conceptually includes a private content such as a photograph or image that a person holds.

Further, when the present invention is structured in a server-client system, the content for the present invention may be a bulletin board, SNS (Social Networking Service) or the like.

(5) In the above-described embodiments, contents are transferred between one transmission device and one reception device, using a cable being a communication path. However, the structure where contents are transferred using a communication path is not indispensable for the present invention. In the present invention, contents may be transferred using a recording medium such as a DVD-RAM or SD card, not using a communication path.

Further, in the above-described embodiments, stationary devices are used for the transmission device and the reception device, as one example. However, not limited to this, the transmission device and the reception device of the present invention may be, for example, portable devices that can be transported, or software in computers.

(6) In the above-described embodiments, contents circulate over a plurality of copyright protection systems.

More specifically, the broadcast station device, which broadcasts digital terrestrial broadcasts in Japan, transmits a content by protecting the content by the B-CAS (BS-Conditional Access System) that is a copyright protection standard for broadcasting, and the reception device, which is an authorized TV receiver, removes the protection by the B-CAS from the content, and displays the content on the display.

When transmitting a content to the reception device, the transmission device removes the protection by the B-CAS from the content, and re-protects the content by the DTCP (Digital Transmission Content Protection) that is a copyright protection standard of IEEE1394. The transmission device then transmits the content to the reception device using a cable conforming to the IEEE1394 (the cable 60).

Upon receiving the content, if it is to record the received content onto a DVD-RAM medium, the reception device removes the protection by the DTCP from the content, and re-protects the content by the CPRM (Content Protection for Recordable Media) that is a copyright protection standard for DVD-RAM. The reception device then records the content onto the DVD-RAM medium.

The above-mentioned B-CAS, DTCP, and CPRM are copyright protection standards that are managed by different associations. Accordingly, if a content having been copied in an unauthorized manner is found in the system, it is first necessary to detect which content protection standard has been analyzed by the unauthorized user.

The above-described embodiments provide a structure where the device identifiers of the reception and transmission devices are embedded into the content as an electronic watermark, for the purpose of identifying the device that generated a pirated content. However, the present invention may have a structure where a reception device system identifier and a transmission device system identifier, which are information for identifying the systems to which the reception and transmission devices belong respectively, are embedded into the content instead of the device identifiers, to identify which content protection standard has been analyzed by the unauthorized user. It is presumed here that each system has been assigned a system identifier preliminarily. For example, "01" is assigned to the TV receiver system, and "02" is assigned to the DVD recorder system. The transmission device embed, as electronic watermarks, a transmission device system identifier 01 and a reception device system identifier 02 into the n pieces of first content data.

(7) Furthermore, the present invention is not limited to the structure where contents circulate over a plurality of copyright protection systems.

The present invention includes a structure where a reception device and a transmission device transfer contents to each other using the same copyright protection system.

(8) In the above-described embodiments, contents are transferred between two terminal devices, namely, the transmission device and the reception device. However, not limited to this system, the present invention is applicable to such a system where three or more terminal devices (referred to as terminal devices A, B, and C, for example) exist, a content is transferred from the terminal device A to the terminal device B, and then the same content is transferred from the terminal device B to the terminal device C.

(9) The electronic watermark embedding process of the present invention may be performed using the following method.

That is to say, media systems, such as a broadcast medium and a recording medium, respectively hold different electronic watermark embedding parameters, and a device belonging to each media system embeds an electronic watermark using the electronic watermark embedding parameter. The parameter held by each media system may be confidential to the other media systems. The parameter may include, for example, information indicating which part of the content the electronic watermark is embedded, information indicating which frequency band the electronic watermark is embedded, and/or information indicating what algorithm is used to embed the electronic watermark.

With the above-described structure, if a pirated content is found to be distributed in the market, it is possible to identify which media system has the device that embedded the electronic watermark into the pirated content.

(10) The electronic watermark embedding process of the present invention may use an asymmetric electronic watermark algorithm.

Here, the asymmetric electronic watermark algorithm is such an algorithm that one cannot embed an electronic watermark if the one does not know predetermined secret information, but all who know public information corresponding to the predetermined secret information can extract the embedded electronic watermark.

If a pirated content is found to be distributed in the market, it is possible to identify the source of the pirated content by detecting which media system embedded the electronic watermark into the pirated content, using the asymmetric electronic watermark.

(11) In the present invention, the electronic watermark embedded in the content is not limited to the data recited in the above-described embodiments.

For example, a piece of data, which is one of the electronic watermarks that are recited to be embedded in the above-described embodiments, may be preliminarily associated with an ID, and the ID may be embedded into the content, instead of the data itself. That is to say, the electronic watermark embedded into the content may be anything in so far as the electronic watermark makes it possible for the unauthentic content source identifying device to track the content when a pirated content of the content is found to be distributed in the market.

(12) In the present invention, the electronic watermark embedded into the content may not be the whole of the data that is recited to be embedded in any of the above-described embodiments, but may be part of the data.

For example, the lower 10 bits of the data, which is recited to be embedded in any of the above-described embodiments, may be embedded. In this case, there is a possibility that the same electronic watermark is embedded from two or more different pieces of data, and this may make it impossible to identify the source of the pirated content only by one performance of the unauthentic content source identification process. Nonetheless, it is possible to narrow down the source by repeating, a plurality of times, the unauthentic content source identification process and finally identify the unauthentic content source uniquely. The merits of this structure are: (a) if a third party extracts the electronic watermark from the content, the third party cannot grasp the whole of the data that contains the watermark as part, which contributes to the protection of privacy, and (b) even if the electronic watermark embedding technology is given some restriction (for example, only up to several tens of bits can be embedded), the same advantageous effects as in the above-described embodiments can be achieved.

(13) In the present invention, the electronic watermark to be embedded into the content may be encrypted using a public key of the server or the device (or a common key in the common key encryption system). With this structure, if a third party extracts the electronic watermark from the content, the third party cannot grasp the original data of the watermark from the extracted watermark and cannot determine the information selected by the reception device. This enables a safer content circulation to be achieved. Further, by using a probability encryption (such as the ElGamal encryption) as the public key encryption method, it is possible to achieve a higher security since a different encrypted text is output every time the same message is encrypted.

(14) In the present invention, the electronic watermark to be embedded into the content may be information for identifying the transmission device and/or the reception device (for example, the copyright protection system ID or the terminal ID). Also, this information may be added to the header or footer of the content. This makes it easier for the unauthentic content source identifying device to track the source device of the pirated content.

(15) The present invention is adaptable to a system in which the reception device transfers a content to another reception device.

In this case, a plurality of electronic watermarks may be embedded into the same content so that the source device of the pirated content can be tracked in the same way as in the above-described embodiments.

Further, in this case, the following modifications are possible.

(a) Information indicating the number of generations or the number of copies may be added to the content.

(b) The transmission device may detect portions in which no electronic watermark is embedded, and embed electronic watermarks into the detected portions.

(c) Electronic watermarks may be embedded into portions whose positions are uniquely determined from the information (for example, terminal ID) about the transmission device and reception device, using, for example, a one-way function.

(d) Electronic watermarks may be embedded in order (A, B, C, . . . ) from the start of the content.

(e) Each reception device may use a different electronic watermark embedding technology. Alternatively, each reception device may use a different electronic watermark embedding parameter (for example, frequency band).

(f) Any of (a) through (e) described above may be combined with each other. For example, in the same content protection system, electronic watermarks may be embedded in order (A, B, C, . . . ) from the start of the content, and in different content protection systems, different electronic watermark embedding systems may be used, respectively.

(16) One aspect of the present invention is a transmission device for transmitting contents to a reception device, the transmission device comprising: a candidate key transmitting unit that transmits a plurality of first calculation content keys to the reception device, where the first calculation content keys are generated by performing a first calculation onto a plurality of content keys; a selected key obtaining unit that obtains, from the reception device, a second calculation content key that is generated by performing a second calculation onto a first calculation content key that was selected by the reception device from among the plurality of first calculation content keys; an evidence information generating unit that generates evidence information by performing a third calculation onto the second calculation content key, the third calculation being an inverse conversion of the first calculation; an evidence embedding unit that embeds, as an electronic watermark to each of a plurality of contents that are identical with each other in substance, (a) the evidence information and (b) a hash value of a content key, where each content key corresponds to a respective one of the plurality of contents; an encryption unit that generates a plurality of encrypted contents by encrypting each of the plurality of contents, in which the evidence information and the hash value have been embedded, using the content key corresponding to the content; and a content transmission unit that transmits the evidence information and the plurality of encrypted contents to the reception device.

Another aspect of the present invention is a transmission device for transmitting contents to a reception device, the transmission device comprising: a candidate information transmitting unit that transmits a plurality of pieces of candidate information to the reception device; a selection information obtaining unit that obtains, from the reception device, selection information that was generated by the reception device by performing a first calculation onto (a) a piece of candidate information that was selected by the reception device from among the plurality of pieces of candidate information and (b) a decryption content key that was generated by the reception device; a copy unit that copies the selection information and thereby generates a plurality of pieces of selection information; a content key generating unit that generates a plurality of content keys by performing a second calculation onto the plurality of pieces of selection information, the second calculation being an inverse conversion of the first calculation; an evidence embedding unit that embeds, as an electronic watermark to each of a plurality of contents that are identical with each other in substance, (a) the selection information and (b) a hash value of a content key, where each content key corresponds to a respective one of the plurality of contents; an encryption unit that generates a plurality of encrypted contents by encrypting each of the plurality of contents, in which the selection information and the hash value have been embedded, using the content key corresponding to the content; and a content transmission unit that transmits the plurality of encrypted contents to the reception device.

A further aspect of the present invention is a reception device for receiving contents from a transmission device, the reception device comprising: a candidate key receiving unit that receives a plurality of encrypted content keys from the transmission device, where the encrypted content keys are generated by encrypting a plurality of content keys; a key selecting unit that selects one from among the plurality of encrypted content keys; a selected key converting unit that generates a first calculation content key by performing a first calculation onto the selected encrypted content key; a selected key transmitting unit that transmits the first calculation content key to the transmission device; a content key receiving unit that receives, from the transmission device, a second calculation content key that is generated by performing a second calculation onto the first calculation content key; a decryption key obtaining unit that obtains a decryption key by performing a third calculation onto the second calculation content key, the third calculation being an inverse conversion of the first calculation; a content receiving unit that receives, from the transmission device, a plurality of encrypted content keys that were encrypted based on the plurality of content keys; and a decryption unit that obtains a content by decrypting one of the plurality of encrypted contents based on the decryption content key.

A still further aspect of the present invention is a reception device for receiving contents from a transmission device, the reception device comprising: a candidate information receiving unit that receives a plurality of pieces of candidate information from the transmission device; a selecting unit that selects one from among the plurality of pieces of candidate information; a decryption content key generating unit that generates a decryption content key; a selection information generating unit that generates selection information by performing a first calculation onto (a) the piece of candidate information selected by the selecting unit and (b) the decryption content key; a selection information transmitting unit that transmits the selection information to the transmission device; a content receiving unit that receives, from the transmission device, a plurality of encrypted contents that were encrypted based on a plurality of content keys that were generated by performing a second calculation onto (c) the plurality of pieces of candidate information and (d) the selection information, the second calculation being an inverse conversion of the first calculation; and a decryption unit that obtains a content by decrypting one of the plurality of encrypted contents based on the decryption content key.

(17) The present invention may be methods shown by the above. The present invention may be a computer program that allows a computer to realize the methods, or may be digital signals representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording mediums.

Furthermore, the present invention may be the computer program or the digital signal transmitted on an electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(18) Part or all of constituent elements constituting each of the above-described devices may be achieved in a system LSI (Large Scale Integration). The system LSI is an ultra multi-functional LSI that is manufactured by integrating a plurality of components on one chip. More specifically, the system LSI is a computer system that includes a microprocessor, ROM, and RAM. A computer program is stored in the RAM. The microprocessor operates in accordance with the computer program, thereby enabling the system LSI to achieve its functions. Also, the integrated circuit may not necessarily be achieved by the LSI, but may be achieved by a dedicated circuit. Also, the system LSI may be replaced with the FPGA (Field Programmable Gate Array) that can be re-programmed after the LSI is manufactured, or the reconfigurable processor that can re-configure the connection or setting of circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(19) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(20) The present invention may be any combination of the above-described embodiments and modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

The invention claimed is:

1. A content distribution system for transferring content, candidate information and evidence information being embedded in the content, the content distribution system comprising:
a transmission device;
a reception device; and
an unauthentic content source identifying device for identifying unauthentic content,
wherein the reception device comprises a non-transitory memory device configured to store at least one program; and at least one hardware processor configured to execute the at least one program and cause the reception device to:
select one piece of candidate information from a plurality of pieces of candidate information; and
generate modified information, the modified information being based on the selected one piece of candidate information, and
the transmission device comprises a non-transitory memory device configured to store at least one program; and at least one hardware processor configured to execute the at least one program and cause the reception device to:
generate a plurality of contents from one content by copying of the one content;
generate the plurality of pieces of candidate information of different values, the plurality of pieces of candidate information corresponding to the plurality of the contents, respectively, one of the plurality of pieces of candidate information being selected by the reception device, and the plurality of pieces of candidate information restricting the reception device so that only one of the plurality of contents can be used;
transmit the plurality of pieces of candidate information to the reception device;
receive from the reception device the modified information;
obtain evidence information based on the modified information, the evidence information being associated with the one piece of candidate information selected by the reception device and identifying one of the plurality of contents that can be used by the reception device having received the plurality of contents, the transmission device not being able to determine the one piece of candidate information selected by the reception device;
embed the plurality of pieces of candidate information into the plurality of corresponding contents, respectively;
embed the evidence information into the plurality of the contents, respectively; and
transmit to the reception device the plurality of contents with the plurality of pieces of candidate information and the evidence information embedded into the plurality of the contents, and wherein the unauthentic content source identifying device determines, by comparing a piece of candidate information embedded in a pirated content by the transmission device with evidence information embedded in the pirated content by the transmission device, whether a source of the pirated content is the reception device or the transmission device.

2. The content distribution system of claim 1, wherein the reception device further configured to:
hold one piece of key information pertaining to the piece of candidate information selected by the reception device;
receive the plurality of contents transmitted by the transmission device;
select one content pertaining to the piece of candidate information selected by the reception device, from among the plurality of contents received by the reception device; and
decrypt the content selected by the reception device, by using the piece of key information held.

3. A content tracking method for use in a content distribution system which includes a transmission device, a reception device, and an unauthentic content source identifying device, the content tracking method comprising:
in the transmission device:
generating, a plurality of pieces of candidate information; and
transmitting, the generated plurality of pieces of candidate information to the reception device,
in the reception device:
receiving, the plurality of pieces of candidate information transmitted from the transmission device and selecting one piece of the plurality of pieces of candidate information from the received plurality of pieces of candidate information;
generating, a piece of modified information based on the selected one piece of candidate information; and
transmitting, the generated piece of modified information to the transmission device;
further in the transmission device:
receiving, the piece of modified information transmitted from the reception device;
generating, a plurality of contents from one content by copying the one content;
obtaining, evidence information based on the received piece of modified information;
embedding, the evidence information into each of the generated plurality of contents, and embedding a different one of the plurality of pieces of candidate information into each of the plurality of contents in which the evidence information has been embedded; and
transmitting, the plurality of contents, in each of which a different piece of candidate information and evidence information has been embedded, to the reception device; and
in an unauthentic content source identifying device configured to identify unauthentic content:
determining, using an unauthentic content source identifying device, by comparing a piece of candidate information embedded in a pirated content by the transmission device with evidence information embedded in the pirated content by the transmission device, whether a source of the pirated content is the reception device or the transmission device.

4. The content tracking method of claim 3, further comprising: (i) in the reception device:
holding one piece of key information pertaining to the selected piece of candidate information;

receiving the plurality of contents transmitted from the transmission device;
selecting one content pertaining to the selected piece of candidate information from among the received plurality of contents; and
decrypting the selected content by using the piece of key information.

* * * * *

UNITED STATES PATENT AND TRADEMARK OFFICE
CERTIFICATE OF CORRECTION

| | | |
|---|---|---|
| PATENT NO. | : 8,972,300 B2 | Page 1 of 1 |
| APPLICATION NO. | : 11/790613 | |
| DATED | : March 3, 2015 | |
| INVENTOR(S) | : Masao Nonaka et al. | |

It is certified that error appears in the above-identified patent and that said Letters Patent is hereby corrected as shown below:

On the Title Page

Item (73), Assignee, "Panasonic Corporation, Osaka (JP)" should read --Panasonic Corporation, Osaka (JP)-- and --The University of Tokyo, Tokyo (JP)--

Signed and Sealed this
Twenty-second Day of December, 2015

Michelle K. Lee
*Director of the United States Patent and Trademark Office*